US012793264B2

(12) United States Patent
He et al.

(10) Patent No.: US 12,793,264 B2
(45) Date of Patent: Nov. 10, 2026

(54) HIGH-PRECISION VEHICLE POSITIONING

(71) Applicant: BEIJING BAIDU NETCOM SCIENCE TECHNOLOGY CO., LTD., Beijing (CN)

(72) Inventors: Yuzhe He, Beijing (CN); Shuang Liang, Beijing (CN); Xiaofei Rui, Beijing (CN); Chengying Cai, Beijing (CN); Guowei Wan, Beijing (CN); Ye Zhang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 266 days.

(21) Appl. No.: 18/605,423

(22) Filed: Mar. 14, 2024

(65) Prior Publication Data

US 2024/0221215 A1 Jul. 4, 2024

(30) Foreign Application Priority Data

May 30, 2023 (CN) ......................... 202310628177.5

(51) Int. Cl.
*G06K 9/00* (2022.01)
*G06T 7/73* (2017.01)
(Continued)

(52) U.S. Cl.
CPC ............ *G06T 7/75* (2017.01); *G06V 10/7715* (2022.01); *G06V 10/80* (2022.01); *G06T 2207/10028* (2013.01); *G06T 2207/20221* (2013.01)

(58) Field of Classification Search
CPC ............. G06T 7/75; G06T 2207/10028; G06T 2207/20221; G06T 7/73;
(Continued)

(56) References Cited

U.S. PATENT DOCUMENTS

2013/0222550 A1* 8/2013 Choi ..................... G01S 17/894 348/47
2022/0214186 A1* 7/2022 Bagheri ................. G01C 21/32
(Continued)

FOREIGN PATENT DOCUMENTS

CN 111142116 A 5/2020
CN 111220154 A 6/2020
(Continued)

OTHER PUBLICATIONS

Lu, Weixin, et al. "L3-net: Towards learning based lidar localization for autonomous driving." Proceedings of the IEEE/CVF conference on computer vision and pattern recognition. 2019. (Year: 2019).*

*Primary Examiner* — Gregory A Morse
*Assistant Examiner* — Owais I Memon
(74) *Attorney, Agent, or Firm* — Leydig, Voit & Mayer, Ltd.

(57) ABSTRACT

A method is provided that includes: obtaining an initial pose of a vehicle, a multi-modal sensor data of the vehicle, and a plurality of map elements for positioning the vehicle; encoding the multi-modal sensor data to obtain an environmental feature; encoding the plurality of map elements to obtain a map feature; determining, based on the environmental feature and the map feature, a target pose offset for correcting the initial pose; and superimposing the initial pose and the target pose offset to obtain a corrected pose of the vehicle.

18 Claims, 8 Drawing Sheets

(51) Int. Cl.

| | |
|---|---|
| ***G06V 10/77*** | (2022.01) |
| ***G06V 10/80*** | (2022.01) |

(58) Field of Classification Search

CPC ...... G06T 2207/30252; G06V 10/7715; G06V 10/80; G06V 10/82; G06V 20/56; G06V 10/26; G06V 10/761; G06V 10/774; G01C 21/28; G01C 21/32; G01C 21/3815; G01C 21/3841; G01S 13/86; G01S 13/865; G01S 13/867; G01S 13/89; G01S 17/86; G01S 17/89

See application file for complete search history.

(56) References Cited

U.S. PATENT DOCUMENTS

| | | | | |
|---|---|---|---|---|
| 2022/0261590 | A1* | 8/2022 | Brahma | G06V 20/56 |
| 2023/0093680 | A1* | 3/2023 | Song | G01S 17/89<br>702/152 |
| 2023/0154203 | A1* | 5/2023 | Guo | G06V 20/56<br>382/181 |

FOREIGN PATENT DOCUMENTS

| | | | |
|---|---|---|---|
| CN | 112308913 | A | 2/2021 |
| CN | 115775379 | A | 3/2023 |
| CN | 115952248 | A | 4/2023 |
| JP | 2019133658 | A | 8/2019 |

* cited by examiner

HIGH-PRECISION VEHICLE POSITIONING

CROSS-REFERENCE TO RELATED APPLICATIONS

This application claims priority to Chinese patent application No. 202310628177.5, filed on May 30, 2023, the contents of which are hereby incorporated by reference in their entirety for all purposes.

TECHNICAL FIELD

The present disclosure relates to the field of artificial intelligence technologies, in particular to the field of autonomous driving, deep learning, computer vision, and other technologies, and specifically to a high-precision vehicle positioning method, an electronic device, and a computer-readable storage medium.

BACKGROUND

An autonomous driving technology relates to a plurality of aspects such as environmental perception, behavioral decision making, trajectory planning, and motion control. Based on collaboration of a sensor, a vision computing system, and a positioning system, a vehicle with an autonomous driving function may automatically run without a driver or under a small number of operations of a driver. Accurately positioning the autonomous vehicle is an important premise to ensure safe and stable running of the autonomous vehicle.

Methods described in this section are not necessarily methods that have been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

SUMMARY

According to an aspect of the present disclosure, a vehicle positioning method is provided, including: obtaining an initial pose of a vehicle, a multi-modal sensor data of the vehicle, and a plurality of map elements for positioning the vehicle; encoding the multi-modal sensor data to obtain an environmental feature; encoding the plurality of map elements to obtain a map feature; determining, based on the environmental feature and the map feature, a target pose offset for correcting the initial pose; and superimposing the initial pose and the target pose offset to obtain a corrected pose of the vehicle.

According to an aspect of the present disclosure, an electronic device is provided, including: a processor; and a memory communicatively connected to the processor. The memory stores instructions executable by the processor. The instructions, when executed by the processor, cause the processor to perform operations including: obtaining an initial pose of a vehicle, a multi-modal sensor data of the vehicle, and a plurality of map elements for positioning the vehicle; encoding the multi-modal sensor data to obtain an environmental feature; encoding the plurality of map elements to obtain a map feature; determining, based on the environmental feature and the map feature, a target pose offset for correcting the initial pose; and superimposing the initial pose and the target pose offset to obtain a corrected pose of the vehicle.

According to an aspect of the present disclosure, a non-transitory computer-readable storage medium storing computer instructions is provided. The computer instructions are configured to cause a computer to perform operations including: obtaining an initial pose of a vehicle, a multi-modal sensor data of the vehicle, and a plurality of map elements for positioning the vehicle; encoding the multi-modal sensor data to obtain an environmental feature; encoding the plurality of map elements to obtain a map feature; determining, based on the environmental feature and the map feature, a target pose offset for correcting the initial pose; and superimposing the initial pose and the target pose offset to obtain a corrected pose of the vehicle.

BRIEF DESCRIPTION OF THE DRAWINGS

The accompanying drawings show embodiments and form a part of the specification, and are used to explain example implementations of the embodiments together with a written description of the specification. The embodiments shown are merely for illustrative purposes and do not limit the scope of the claims. Throughout the accompanying drawings, the same reference numerals denote similar but not necessarily same elements.

DETAILED DESCRIPTION OF EMBODIMENTS

Figure 1:
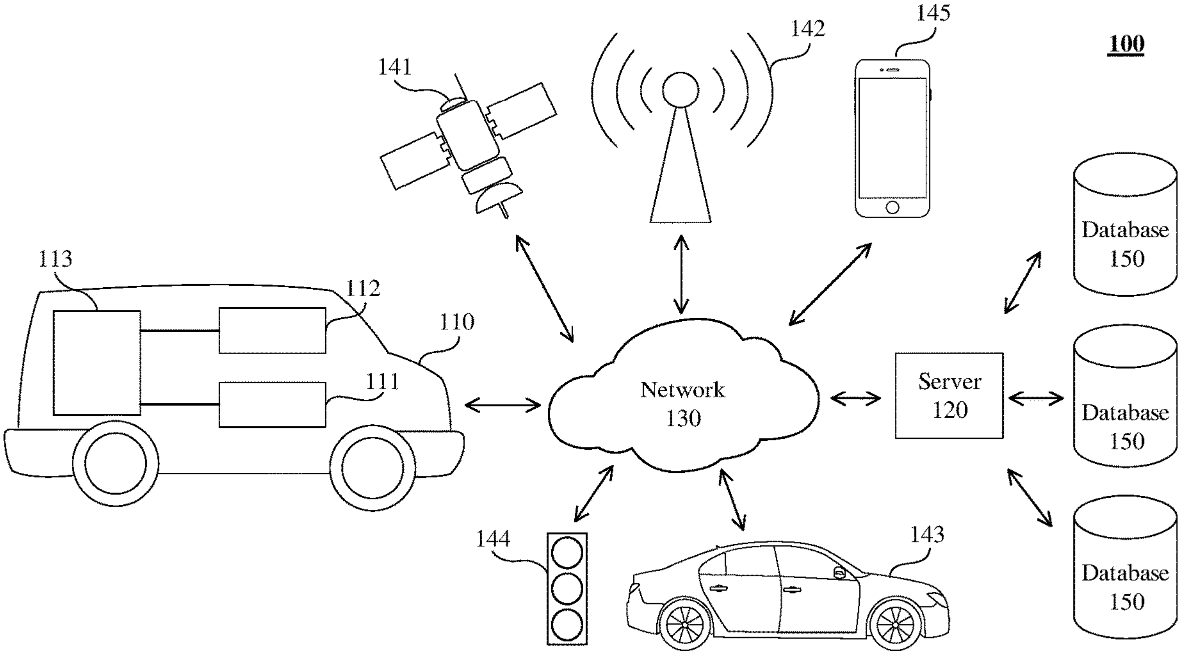
FIG. 1 is a schematic diagram of an example system in which various methods described herein can be implemented according to some embodiments of the present disclosure.

Example embodiments of the present disclosure are described below in conjunction with the accompanying drawings, where various details of the embodiments of the present disclosure are included to facilitate understanding, and should only be considered as example. Therefore, those of ordinary skill in the art should be aware that various changes and modifications can be made to the embodiments described herein, without departing from the scope of the present disclosure. Likewise, for clarity and conciseness, the description of well-known functions and structures is omitted in the following description.

In the present disclosure, unless otherwise stated, the terms "first", "second", etc., used to describe various elements are not intended to limit the positional, temporal or importance relationship of these elements, but rather only to distinguish one element from the other. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements, unless otherwise expressly indicated in the context. Moreover, the term "and/or" used in the present disclosure encompasses any of and all possible combinations of listed items.

In the technical solutions of the present disclosure, obtaining, storage, application, etc. of personal information of a user all comply with related laws and regulations and are not against the public order and good morals.

In the related art, an autonomous vehicle is usually positioned using an integrated positioning system. The integrated positioning system usually includes a global navigation satellite system (GNSS) and an inertial navigation system (INS). The INS includes an inertial measurement unit(IMU). The GNSS receives a satellite signal to implement global positioning. The IMU implements calibration of positioning information. However, in a complex road environment, for example, a tunnel, a flyover, or an urban road among high-rise buildings, the satellite signal is often lost or be of great error. As a result, the integrated positioning system has low positioning precision, and cannot provide a positioning service continuously and reliably.

For the above problem, the present disclosure provides a vehicle positioning method, to improve precision of positioning an autonomous vehicle.

The present disclosure further provides a vectorized map construction method and a positioning model training method. A constructed vectorized map and a trained positioning model can be used to position the autonomous vehicle, so as to improve the precision of positioning the vehicle.

The embodiments of the present disclosure will be described below in detail with reference to the accompanying drawings.

FIG. 1 is a schematic diagram of an example system 100 in which various methods and apparatuses described herein can be implemented according to some embodiments of the present disclosure. Refer to FIG. 1. The system 100 includes a motor vehicle 110, a server 120, and one or more communication networks 130 that couple the motor vehicle 110 to the server 120.

In the embodiments of the present disclosure, the motor vehicle 110 may include an electronic device according to the embodiments of the present disclosure and/or may be configured to carry out the method according to the embodiments of the present disclosure.

The server 120 may run one or more services or software applications that enable the vectorized map construction method or the positioning model training method according to the embodiments of the present disclosure to be performed. In some embodiments, the server 120 may further provide other services or software applications that may include a non-virtual environment and a virtual environment. In the configuration shown in FIG. 1, the server 120 may include one or more components that implement functions performed by the server 120. These components may include software components, hardware components, or a combination thereof that can be executed by one or more processors. A user of the motor vehicle 110 may sequentially use one or more client applications to interact with the server 120, thereby utilizing the services provided by these components. It should be understood that various different system configurations are possible, and may be different from that of the system 100. Therefore, FIG. 1 is an example of the system for implementing various methods described herein, and is not intended to be limiting.

The server 120 may include one or more general-purpose computers, a dedicated server computer (e.g., a personal computer (PC) server, a UNIX server, or a terminal server), a blade server, a mainframe computer, a server cluster, or any other suitable arrangement and/or combination. The server 120 may include one or more virtual machines running a virtual operating system, or other computing architectures related to virtualization (e.g., one or more flexible pools of logical storage devices that can be virtualized to maintain virtual storage devices of a server). In various embodiments, the server 120 can run one or more services or software applications that provide functions described below.

A computing unit in the server 120 can run one or more operating systems including any one of the above operating systems and any commercially available server operating system. The server 120 can also run any one of various additional server applications and/or middle-tier applications, including an HTTP server, an FTP server, a CGI server, a JAVA server, a database server, etc.

In some implementations, the server 120 may include one or more applications to analyze and merge data feeds and/or event updates received from the motor vehicle 110. The server 120 may further include one or more applications to display the data feeds and/or real-time events through one or more display devices of the motor vehicle 110.

The network 130 may be any type of network well known to those skilled in the art, and may use any one of a plurality of available protocols (including but not limited to TCP/IP, SNA, IPX, etc.) to support data communication. As a mere example, the one or more networks 130 may be a satellite communication network, a local area network (LAN), an Ethernet-based network, a token ring, a wide area network (WAN), the Internet, a virtual network, a virtual private network (VPN), an intranet, an extranet, a blockchain network, a public switched telephone network (PSTN), an infrared network, a wireless network (such as Bluetooth or Wi-Fi), and/or any combination of these and other networks.

The system 100 may further include one or more databases 150. In some embodiments, these databases can be used to store data and other information. For example, one or more of the databases 150 can be configured to store information such as an audio file and a video file. The data repository 150 may reside in various locations. For example, a data repository used by the server 120 may be locally in the server 120, or may be remote from the server 120 and may communicate with the server 120 through a network-based or dedicated connection. The data repository 150 may be of different types. In some embodiments, the data repository used by the server 120 may be a database, such as a relational database. One or more of these databases can store, update, and retrieve data from or to the database, in response to a command.

In some embodiments, one or more of the databases 150 may also be used by an application to store application data. The database used by the application may be of different types, for example, may be a key-value repository, an object repository, or a regular repository backed by a file system.

The motor vehicle 110 may include a sensor 111 for sensing the surrounding environment. The sensor 111 may include one or more of the following sensors: a visual camera, an infrared camera, an ultrasonic sensor, a millimeter-wave radar, and a lidar (LiDAR). Different sensors can provide different detection precision and ranges. Cameras can be mounted in the front of, at the back of, or at other locations of the vehicle. Visual cameras can capture the situation inside and outside the vehicle in real time and present it to the driver and/or passengers. In addition, by analyzing the image captured by the visual cameras, information such as indications of traffic lights, conditions of crossroads, and operating conditions of other vehicles can be obtained. Infrared cameras can capture objects in night vision. Ultrasonic sensors can be mounted around the vehicle to measure the distances of objects outside the vehicle from the vehicle using characteristics such as the strong ultrasonic directivity. Millimeter-wave radars can be mounted in the front of, at the back of, or at other locations of the vehicle to measure the distances of objects outside the vehicle from the vehicle using the characteristics of electromagnetic waves. Lidars can be mounted in the front of, at the back of, or at other locations of the vehicle to detect edge and shape information of objects, so as to perform object recognition and tracking. Due to the Doppler effect, the radar apparatuses can also measure the velocity changes of vehicles and moving objects.

The motor vehicle 110 may further include a communication apparatus 112. The communication apparatus 112 may include a satellite positioning module that can receive satellite positioning signals (for example, BeiDou, GPS, GLONASS, and GALILEO) from a satellite 141 and generate coordinates based on the signals. The communication apparatus 112 may further include a module for communicating with a mobile communication base station 142. The mobile communication network can implement any suitable communication technology, such as GSM/GPRS, CDMA, LTE, and other current or developing wireless communication technologies (such as 5G technology). The communication apparatus 112 may further have an Internet of Vehicles or vehicle-to-everything (V2X) module, which is configured to implement communication between the vehicle and the outside world, for example, vehicle-to-vehicle (V2V) communication with other vehicles 143 and vehicle-to-infrastructure (V2I) communication with infrastructures 144. In addition, the communication apparatus 112 may further have a module configured to communicate with a user terminal 145 (including but not limited to a smartphone, a tablet computer, or a wearable apparatus such as a watch) by using a wireless local area network or Bluetooth of the IEEE 802.11 standards. With the communication apparatus 112, the motor vehicle 110 may further access the server 120 through the network 130.

The motor vehicle 110 may further include an inertial navigation module. The inertial navigation module and the satellite positioning module may be combined into an integrated positioning system to implement initial positioning of the motor vehicle 110.

The motor vehicle 110 may further include a control apparatus 113. The control apparatus 113 may include a processor that communicates with various types of computer-readable storage apparatuses or media, such as a central processing unit (CPU) or a graphics processing unit (GPU), or other dedicated processors. The control apparatus 113 may include an autonomous driving system for automatically controlling various actuators in the vehicle. Correspondingly, the motor vehicle 110 is an autonomous vehicle. The autonomous driving system is configured to control a powertrain, a steering system, a braking system, and the like (not shown) of the motor vehicle 110 through a plurality of actuators in response to inputs from a plurality of sensors 111 or other input devices to control acceleration, steering, and braking, respectively, with no human intervention or limited human intervention. Part of the processing functions of the control apparatus 113 can be implemented by cloud computing. For example, a vehicle-mounted processor can be used to perform some processing, while cloud computing resources can be used to perform other processing. The control apparatus 113 may be configured to carry out the method according to the present disclosure. In addition, the control apparatus 113 may be implemented as an example of the electronic device of the motor vehicle (client) according to the present disclosure.

The system 100 in FIG. 1 may be configured and operated in various manners, such that the various methods and apparatuses described according to the present disclosure can be applied.

According to some embodiments, the server 120 may carry out the vectorized map construction method according to the embodiments of the present disclosure to construct a vectorized map, and carry out the positioning model training method according to the embodiments of the present disclosure to train a positioning model. The constructed vectorized map and the trained positioning model may be transmitted to the motor vehicle 110. The motor vehicle 110 may carry out the vehicle positioning method according to the embodiments of the present disclosure by using the vectorized map and the positioning model, so as to implement accurate positioning of the motor vehicle.

According to some other embodiments, the vectorized map construction method and the positioning model training method may alternatively be carried out by the motor vehicle 110. This usually requires the motor vehicle 110 to have a high hardware configuration and a high computing capability.

According to some embodiments, the vehicle positioning method may alternatively be carried out by the server 120. In this case, the motor vehicle 110 uploads related data (including an initial pose and multi-modal sensor data) to the server 120. Correspondingly, the server 120 obtains the data uploaded by the motor vehicle 110, and carries out the vehicle positioning method to process the data, so as to accurately position the motor vehicle 110.

High-precision positioning information obtained by performing the vehicle positioning method according to the embodiments of the present disclosure may be used in trajectory planning, behavioral decision making, motion control, and other tasks of the motor vehicle 110.

Figure 2:
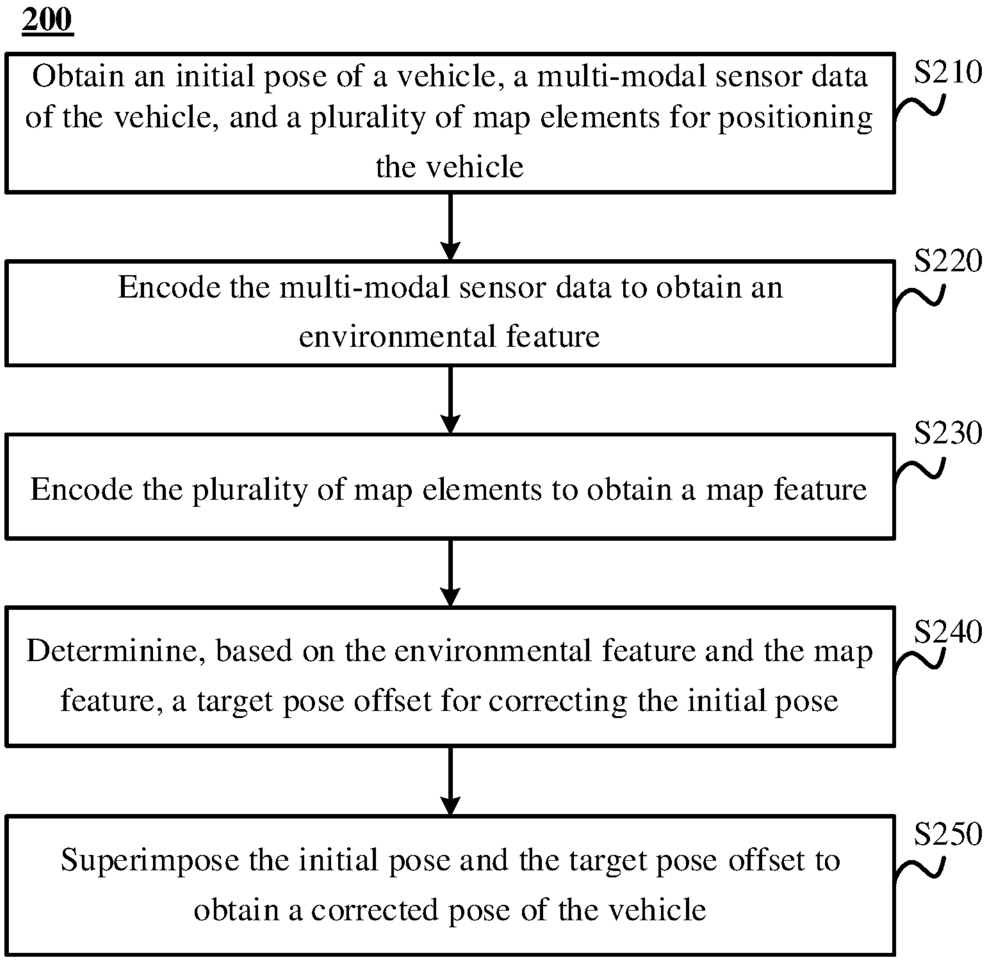
FIG. 2 is a flowchart of a vehicle positioning method according to some embodiments of the present disclosure.

FIG. 2 is a flowchart of a vehicle positioning method 200 according to some embodiments of the present disclosure. As described above, the method 200 may be carried out by an autonomous vehicle (for example, the motor vehicle 110 shown in FIG. 1) or a server (for example, the server 120 shown in FIG. 1). As shown in FIG. 2, the method 200 includes steps S210 to S250.

In step S210, an initial pose of a vehicle, a multi-modal sensor data of the vehicle, and a plurality of map elements for positioning the vehicle are obtained.

In step S220, the multi-modal sensor data is encoded to obtain an environmental feature.

In step S230, the plurality of map elements are encoded to obtain a map feature.

In step S240, a target pose offset for correcting the initial pose is determined based on the environmental feature and the map feature.

In step S250, the initial pose and the target pose offset are superimposed to obtain a corrected pose of the vehicle.

According to the embodiments of the present disclosure, the multi-modal sensor data is encoded, so that data of each sensor can be fully utilized, information loss is reduced, and the environmental feature can express surroundings of the vehicle comprehensively and accurately. The target pose offset is determined based on the environmental feature and the map feature, and the initial pose is corrected based on the target pose offset, so that precision of positioning the vehicle can be improved, and the vehicle can be positioned accurately even in a complex environment.

Each step of the method 200 is described in detail below.

In step S210, the initial pose of the vehicle, the multi-modal sensor data of the vehicle, and the plurality of map elements for positioning the vehicle are obtained.

The vehicle in step S210 may be a vehicle with an autonomous driving function, that is, an autonomous vehicle.

In the embodiments of the present disclosure, the initial pose is an uncorrected pose.

According to some embodiments, the initial pose of the vehicle may be a pose output by an integrated positioning system of the vehicle. The integrated positioning system usually includes a satellite positioning system and an inertial navigation system.

According to some embodiments, the vehicle may be positioned based on a preset frequency (for example, 1 Hz). An initial pose at a current moment may be a corrected pose of a pose at a previous moment.

A pose (including the uncorrected initial pose and a corrected pose) of the vehicle is used to indicate a position and an attitude of the vehicle. The position of the vehicle may be represented by, for example, three-dimensional coordinates such as (x, y, z). The attitude of the vehicle may be represented by, for example, an attitude angle. The attitude angle further includes a roll angle ($\phi$), a pitch angle ($\theta$), and a yaw angle ($\psi$).

When traveling, the vehicle usually does not leave the ground, and does not roll or pitch. Therefore, in practice, no attention is paid to accuracy of the z coordinate, the roll angle, and the pitch angle. Correspondingly, in some embodiments of the present disclosure, only the x coordinate, the y coordinate, and the yaw angle in the initial pose may be corrected, and the z coordinate, the roll angle roll, and the pitch angle pitch are not corrected. In other words, the z coordinate, the roll angle, and the pitch angle in the corrected pose are the same as those in the initial pose, but the x coordinate, the y coordinate, and the yaw angle may be different from those in the initial pose.

Various sensors for environmental perception, for example, a visual camera, a lidar, and a millimeter-wave radar, are usually deployed on the vehicle. A modal is an existence form of data. Data acquired by different sensors is usually in different forms, so that data acquired by different sensors usually corresponds to different data modals. For example, data acquired by the visual camera is an image. A plurality of visual cameras in different viewing directions may be deployed on the vehicle. Correspondingly, a plurality of images of different views may be obtained by these visual cameras. Data acquired by the lidar is point cloud. It can be understood that the point cloud usually includes position coordinates and reflection intensity values of a plurality of three-dimensional spatial points.

The multi-modal sensor data of the vehicle can express the surroundings of the vehicle in different forms, so as to comprehensively perceive the surroundings.

According to some embodiments, a vectorized map may be stored in the vehicle or the server.

The vectorized map is a data set that represents a geographical element by using an identifier, a name, a position, an attribute, a topological relationship therebetween, and other information. The vectorized map includes a plurality of geographical elements, and each element is stored as a vector data structure. The vector data structure is a data organization manner in which a spatial distribution of the geographical element is represented by using a point, a line, a surface, and a combination thereof in geometry, and records coordinates and a spatial relationship of the element to express a position of the element.

According to some embodiments, the geographical elements in the vectorized map include a road element and a geometrical element. The road element is an element having a specific semantic content in a road, and includes a lane line, a curb, a stop line, a crosswalk, a traffic sign, a pole, and the like. The pole further includes a tree trunk, an upright post of a traffic sign, a street light pole, and the like. The geometrical element is an element having a specific shape, and includes a surface element (surfel), a line element, and the like. The surface element represents a plane in a physical world, for example, an outer surface of a building, a surface of a traffic light, or a traffic sign. It should be noted that the surface element may have a specific overlap with the road element. For example, some surface elements are also road elements.

The road element is usually sparse. There are few or even no road elements in some road sections. In a road section in which there are few or even no road elements, it is difficult to position the vehicle accurately through road elements. According to the above embodiment, the vectorized map further includes the geometrical element such as the surface element. As a supplement to the road element, the geometrical element can improve richness and density of the geographical elements in the vectorized map, so as to position the vehicle accurately.

According to some embodiments of the present disclosure, the vectorized map is used to position the vehicle. The vectorized map is small and convenient to update, and this reduces storage costs, so that applicability of a vehicle positioning method is improved, and a mass production need can be satisfied.

According to some embodiments, in the vectorized map, the lane line, the curb, and the stop line are represented in a form of a line segment, and endpoints of the line segment are two-dimensional xy coordinates in a global coordinate system, for example, a universal transverse Mercator (UTM) coordinate system. The crosswalk is represented as a polygon, and vertices of the polygon are represented by two-dimensional xy coordinates in the UTM coordinate system. The traffic sign is represented as a rectangle perpendicular to an xy plane, and vertices are three-dimensional UTM coordinates, where a z coordinate is represented by a height relative to the ground. The pole is represented by two-dimensional xy coordinates in the UTM coordinate system and a height of the pole.

According to some embodiments, in the vectorized map, a surface element P is represented as $P=[p^T\ n^T\ r^T]^T \in \mathbb{R}^7$, where $\mathbb{R}$ represents a real number field, $p \in \mathbb{R}^2$ represents xy coordinates of the surface element P in the UTM coordinate system, $n \in \mathbb{R}^3$ represents a unit normal vector of the surface element, and $$r = \left[\frac{\lambda_1}{\lambda_2} \quad \frac{\lambda_1}{\lambda_3}\right]^T, \lambda_1 \leq \lambda_2 \leq \lambda_3$$

are singular values of a covariance matrix of the surface element. An extraction manner for the surface element is described in detail in the following vectorized map construction method 500.

According to some embodiments, the plurality of map elements for positioning the vehicle in step S210 may be obtained by screening the plurality of geographical elements in the vectorized map based on the initial pose. According to some embodiments, a geographical element near the initial pose (that is, a distance from the initial pose is less than a threshold) may be used as a map element for positioning the vehicle. For example, a geographical element within a range of 100 meters near the initial pose (that is, at a distance less than 100 meters from the initial pose) is used as a map element for positioning the vehicle.

According to some embodiments, a preset number of geographical elements with a distance less than the threshold from the initial pose may be used as map elements for positioning the vehicle, so as to balance calculation efficiency and reliability of a positioning result. The preset number may be set as required. For example, the preset number may be set to 100, 500, or 1000. If a number of geographical elements near the initial pose is greater than the preset number, the geographical elements nearby may be sampled to obtain the preset number of geographical elements. Further, the road element may be sampled in ascending order of distances from the initial pose. The surface element may be sampled randomly. The surface element may correspond to different types of entities in the physical world, for example, the outer surface of the building or the traffic sign. Different types of surface elements may apply positioning constraints to the vehicle in different directions. For example, the outer surface of the building (parallel to the lane line) may constrain positioning of the vehicle in left-right directions, and the traffic sign may constrain positioning of the vehicle in a forward direction. Sampling the surface element randomly may make a sampling result cover various types of surface elements uniformly, so as to ensure the accuracy of positioning the vehicle. If a number of geographical elements near the initial pose is less than the preset number, an existing geographical element may be copied to extend the geographical element to the preset number.

According to some embodiments, the multi-modal sensor data and the plurality of map elements that are obtained in step S210 may be preprocessed, so as to improve the precision of subsequently positioning the vehicle.

The multi-modal sensor data may include an image and a point cloud. According to some embodiments, a preprocessing operation such as undistortion, scaling to a preset size, or standardization may be performed on the image. According to some embodiments, the point cloud may be screened based on the initial pose, such that only point clouds near the initial pose are retained. For example, only point clouds that use the initial pose as an origin within a range of [−40 m, 40 m] in the forward direction of the vehicle (an x-axis positive direction), [−40 m, 40 m] in a left direction of the vehicle (a y-axis positive direction), and [−3 m, 5 m] above the vehicle (in a z-axis positive direction) may be retained. Further, the point cloud may be voxelized. To be specific, a space may be divided into a plurality of non-intersecting blocks, and at most 32 points are retained in each block.

As described above, the plurality of map elements obtained from the vectorized map include the lane line, the curb, the stop line, the crosswalk, the traffic sign, the pole, and the surface element. According to some embodiments, the lane line, the curb, and the stop line may be broken into line segments of a same length, and each line segment is represented as a four-dimensional vector $[x_s\ y_s\ x_e\ y_e]^T \in \mathbb{R}^4$, where four values in the vector represent xy coordinates of a start point and an end point of the line segment respectively. The traffic sign is represented as $[x_c\ y_c\ 0\ h_c]^T \in \mathbb{R}^4$, where the first two values in the vector represent xy coordinates of a center of the traffic sign, and the last value in the vector represents a height of the center of the traffic sign relative to the ground. The pole is represented as $[x_p\ y_p\ 0\ h_p]^T \in \mathbb{R}^4$, where the first two values in the vector represent xy coordinates of the pole, and the last value in the vector represents a height of the pole relative to the ground. The surface element may not be preprocessed. To be specific, a representation manner for the surface element may be the same as that in the vectorized map.

In step S220, the multi-modal sensor data is encoded to obtain the environmental feature.

According to some embodiments, as described above, the multi-modal sensor data may include the point cloud and the image. Correspondingly, step S220 may include steps S221 to S223.

In step S221, the point cloud is encoded to obtain a point cloud feature map.

In step S222, the image is encoded to obtain an image feature map.

In step S223, the point cloud feature map and the image feature map are fused to obtain the environmental feature.

According to the above embodiments, sensor data in different modes is encoded separately, and encoding results of sensors are fused, so that the environment can be expressed comprehensively while original data information of different sensors is retained completely and information loss is reduced.

According to some embodiments, for step S221, the point cloud may be encoded into a point cloud feature map in a target three-dimensional space. The target three-dimensional space may be, for example, a bird's eye view (BEV) space of the vehicle. A bird's eye view is an elevated view. The bird's eye view space is a space in a right-handed rectangular Cartesian coordinate system using the position (that is, the initial pose) of the vehicle as an origin. In some embodiments, the bird's eye view space may use the position of the vehicle as an origin, a right direction of the vehicle as an x-axis positive direction, the forward direction of the vehicle as a y-axis positive direction, and a direction over the vehicle as a z-axis positive direction. In some other embodiments, the bird's eye view space may alternatively use the position of the vehicle as an origin, the forward direction of the vehicle as an x-axis positive direction, the left direction of the vehicle as a y-axis positive direction, and a direction over the vehicle as a z-axis positive direction. The point cloud feature map may be a feature map in the target three-dimensional space.

According to some embodiments, the point cloud may be encoded by a trained point cloud encoder. The point cloud encoder may be implemented as a neural network.

According to some embodiments, a point cloud near the vehicle may be divided into a plurality of columnar spaces whose sections (parallel to the xy plane) are squares (for example, 0.5 m*0.5 m). For example, the point cloud near the vehicle may be a point cloud within a range of [−40 m, 40 m] in the forward direction of the vehicle (an x-axis positive direction), [−40 m, 40 m] in the left direction of the vehicle (a y-axis positive direction), and [−3 m, 5 m] above the vehicle (in a z-axis positive direction). Through division, the point cloud near the vehicle falls in a corresponding columnar space. Each columnar space is a grid in the BEV space, and corresponds to one pixel in the point cloud feature map in the BEV space. A resolution of the point cloud feature map (that is, a resolution of the BEV space) is a length in the physical world corresponding to a single pixel (that is, a grid in the BEV space), that is, a side length of a section of the columnar space, for example, 0.5 m per pixel.

Each point in the point cloud may be encoded into, for example, a D-dimensional (D=9) vector: (x, y, z, r, xc, yc, zc, xp, yp), where x, y, z, and r represent three-dimensional coordinates and a reflection intensity of the point respectively, xc, yc, and zc represent a distance between the point and an arithmetic mean point of all points in the columnar space in which the point is located, and xp and yp represent an offset value between the point and an x,y center of the columnar space in which the point is located. Due to sparsity of point cloud data, many columnar spaces may include no point cloud or a small number of point clouds. Considering calculation complexity, it is specified that each columnar space includes at most N point cloud feature vectors, and if a number of point clouds is greater than N, N point clouds are selected through random sampling; or if a number of point clouds is less than N, N point clouds are obtained through zero-filling. According to the above embodiments, the point cloud is encoded into a dense tensor of a dimension of (D, P, N), where P represents the number of columnar spaces.

Each D-dimensional vector is linearly mapped to obtain a C-dimensional vector (for example, C=256), so as to map the tensor (D, P, N) to a tensor (C, P, N). Further, a pooling operation is performed on (C, P, N) to obtain a tensor (C, P).

Each columnar space corresponds to one pixel in the point cloud feature map. The size of the point cloud feature map is H*W*C. H, W, and C represent a height, a width, and a channel number of the point cloud feature map respectively. Specifically, H is a quotient of an x-axis point cloud range and the resolution of the point cloud feature map, W is a quotient of a y-axis point cloud range and the resolution of the point cloud feature map, and C is a dimension of a feature vector corresponding to each pixel. For example, in the above embodiments, both the x-axis and y-axis point cloud ranges are 80 m (that is, [−40 m, 40 m]), the resolution of the point cloud feature map is 0.5 m per pixel, and C=256. Correspondingly, for the point cloud feature map, H=W=80/0.5=160, and the size of the point cloud feature map is 160*160*256.

According to some embodiments, for step S222, the image may be encoded by a trained image encoder. The image encoder may be implemented as a neural network.

According to some embodiments, the image encoder may include a backbone module and a multilayer feature pyramid fusion module. The backbone module may use, for example, a network such as VoVNet-19, VGG, ResNet, or EfficientNet. The multilayer feature pyramid fusion module may use a basic top-down fusion manner, for example, a feature pyramid network (FPN), or may use a network such as BiFPN or a recursive feature pyramid (RFP). The image encoder receives images of different views (for example, six views) to generate a multi-scale feature map. A size of the image is $H_c \times W_c \times 3$. For example, the size of the image may be set to $H_c=448$ and $W_c=640$. Sizes of last two layers of the multi-scale feature map are, for example, $$\frac{H_c}{16} \times \frac{W_c}{16} \times 768 \text{ and } \frac{H_c}{32} \times \frac{W_c}{32} \times 1024$$

respectively. The last two layers of the multi-scale feature map are input to the multilayer feature pyramid fusion module to obtain an image feature map fusing multi-scale information. A size of the image feature map may be, for example, $$\frac{H_c}{16} \times \frac{W_c}{16} \times 256.$$

According to some embodiments, step S223 may include steps S2231 to S2233.

In step S2231, an initial environmental feature map in the target three-dimensional space is determined based on the point cloud feature map.

In step S2232, the initial environmental feature map and the image feature map are fused to obtain a first environmental feature map in the target three-dimensional space.

In step S2233, the environmental feature is determined based on the first environmental feature map.

According to the above embodiments, multi-modal feature fusion is performed in the target three-dimensional space, so that coordinate system differences of different sensors can be eliminated, and accuracy of expressing the environment can be improved.

As described above, the target three-dimensional space may be the bird's eye view space of the vehicle.

According to some embodiments, for step S2231, the point cloud feature map may be used as the initial environmental feature map, or specific processing (for example, convolution processing) may be performed on the point cloud feature map, and a processing result is used as the initial environmental feature map.

According to some embodiments, in step S2232, at least one fusion may be performed on the initial environmental feature map and the image feature map based on attention mechanism, to obtain the first environmental feature map in the target three-dimensional space. The attention mechanism can capture a correlation between features. According to this embodiment, feature fusion with the attention mechanism can improve feature fusion accuracy.

According to some embodiments, the following steps S22321 and S22322 are performed in each of the at least one fusion.

In step S22321, a current environmental feature map is updated based on self-attention mechanism, to obtain an updated environmental feature map.

In step S22322, the updated environmental feature map obtained in step S22321 and the image feature map are fused based on cross-attention mechanism, to obtain a fused environmental feature map.

It should be noted that the current environmental feature map in the first fusion is the initial environmental feature map obtained in step S2231. The current environmental feature map in the second fusion or each subsequent fusion is the fused environmental feature map obtained by the previous fusion. For example, the current environmental feature map in step S22321 in the second fusion is the fused environmental feature map obtained in step S22322 in the first fusion. The fused environmental feature map obtained by the last fusion is used as the first environmental feature map in the target three-dimensional space.

According to some embodiments, for step S22321, the size of the current environmental feature map is H*W*C. H, W, and C represent a height, a width, and a channel number of the current environmental feature map respectively. In step S22321, a feature vector of each pixel (i, j) in the current environmental feature map is updated based on self-attention mechanism, to obtain an updated feature vector of each pixel, where 1≤i≤H, and 1≤j≤W. The updated feature vector of each pixel forms the updated environmental feature map. It can be understood that a size of the updated environmental feature map is still H*W*C.

Specifically, for each pixel in the current environmental feature map, a feature vector of the pixel may be used as a query vector (Query), and a correlation (that is, an attention weight) between the pixel and another pixel may be obtained based on self-attention mechanism. Then, the feature vector of the pixel and a feature vector of other pixels are fused based on the correlation between the pixel and other pixels, to obtain the updated feature vector of the pixel.

According to some embodiments, in step S22321, the current environmental feature map may be updated through a deformable attention (DA) mechanism. In this embodiment, for each pixel (i, j) in the current environmental feature map, the pixel is used as a reference point. Correlations (that is, attention weights) between the pixel and a plurality of neighbor pixels near the reference point are determined based on the deformable attention mechanism. Then, a feature vector of the pixel and feature vectors of the neighbor pixels are fused based on the correlations between the pixel and the neighbor pixels, to obtain an updated feature vector of the pixel.

As described above, the updated environmental feature map may be obtained by step S22321. The updated environmental feature map includes an updated feature vector of each pixel.

According to some embodiments, in step S22322, the updated feature vector of each pixel obtained in step S22321 and the image feature map are fused based on cross-attention mechanism, to obtain the fused environmental feature map. It should be noted that a size of the fused environmental feature map is still H*W*C.

Specifically, for any pixel in the updated environmental feature map, an updated feature vector of the pixel may be used as a query vector, and a correlation (that is, an attention weight) between the pixel and each pixel in the image feature map may be obtained based on cross-attention mechanism. Then, the updated feature vector of the pixel and a feature vector of each pixel in the image feature map are fused based on the correlation between the pixel and each pixel in the image feature map, to obtain a fused feature vector of the pixel.

According to some embodiments, in step S22322, the feature maps may be fused through the deformable attention mechanism. For each pixel (i, j) in the updated environmental feature map, xy coordinates of the pixel in a global coordinate system (for example, the UTM coordinate system) are determined based on the initial pose of the vehicle. A specific number of (for example, four) spatial points are sampled at equal intervals in a height direction at the xy coordinates, these spatial points are mapped to the image feature map by using a pose and an intrinsic parameter of the visual camera, and an obtained projection point is used as a reference point. Correlations (that is, attention weights) between the pixel and a plurality of neighbor pixels near the reference point are determined based on the deformable attention mechanism. Then, a feature vector of the pixel and feature vectors of the neighbor pixels are fused based on the correlations between the pixel and the neighbor pixels, to obtain a fused feature vector of the pixel, so as to obtain the fused environmental feature map.

According to some embodiments, step S2232 may be implemented by a trained first transformer decoder. Specifically, the initial environmental feature map and the image feature map may be input to the trained first transformer decoder to obtain the first environmental feature map output by the first transformer decoder.

According to some embodiments, the first transformer decoder includes at least one transformer layer, and each transformer layer is configured to perform one fusion on the environmental feature map and the image feature map.

Further, each transformer layer may include one self-attention module and one cross-attention module. The self-attention module is configured to update the current environmental feature map to obtain the updated environmental feature map, that is, is configured to implement step S22321. The cross-attention module is configured to fuse the updated environmental feature map and the image feature map to obtain the fused environmental feature map, that is, is configured to implement step S22322.

After the first environmental feature map in the target three-dimensional space is obtained in step S2232, the environmental feature may be determined in step S2233 based on the first environmental feature map.

According to some embodiments, the first environmental feature map may be used as the environmental feature.

According to some other embodiments, at least one upsampling may be performed on the first environmental feature map to obtain at least one second environmental feature map respectively corresponding to the at least one upsampling, and the first environmental feature map and the at least one second environmental feature map may be determined as the environmental feature. For example, a size of the first environmental feature map is 160*160*256, and a resolution is 0.5 m per pixel. The first environmental feature map is upsampled to obtain a 1st second environmental feature map whose size is 320*320*128 and resolution is 0.25 m per pixel. The 1st second environmental feature map is upsampled to obtain a 2nd second environmental feature map whose size is 640*640*64 and resolution is 0.125 m per pixel.

The resolution of the first environmental feature map is usually low. If only the first environmental feature map is used as the environmental feature, and the target pose offset is determined accordingly, the target pose offset may not so accurate. According to the above embodiments, the first environmental feature map is upsampled to obtain the second environmental feature map with a higher resolution, and the first environmental feature map and the second environmental feature map are used as the environmental feature, so that precision of the environmental feature is improved, and accuracy of the target pose offset subsequently determined based on the environmental feature is improved.

For ease of description, the first environmental feature map is denoted as a zeroth-layer environmental feature map, and a second environmental feature map obtained through an lth (l=1, 2, 3 . . . ) upsampling is denoted as an lth-layer environmental feature map. It can be understood that an environmental feature map with a larger number has a larger size and a higher resolution.

In step S230, the plurality of map elements are encoded to obtain the map feature.

As described above, the plurality of map elements are obtained by screening the plurality of geographical elements in the vectorized map based on the initial pose. The geographical elements in the vectorized map include the road element and the geometrical element. Correspondingly, the plurality of map elements obtained through screening also include at least one road element and at least one geometrical element. The at least one road element includes any one of the lane line, the curb, the crosswalk, the stop line, the traffic sign, or the pole. The at least one geometrical element includes the surface element.

According to some embodiments, the surface element is obtained by extracting a plane in a point cloud map. An extraction manner for the surface element is described in detail in the following vectorized map construction method 500.

According to some embodiments, step S230 may include steps S231 and S232.

In step S231, for any map element of the plurality of map elements, element information of the map element is encoded to obtain an initial encoding vector of the map element.

In step S232, the initial encoding vector is updated based on the environmental feature to obtain a target encoding vector of the map element. The map feature includes respective target encoding vectors of the plurality of map elements.

According to some embodiments, the element information of the map element includes position information and category information (that is, semantic information). Correspondingly, step S231 may include steps S2311 to S2313.

In step S2311, the position information is encoded to obtain a position code.

In step S2312, the category information is encoded to obtain a semantic code.

In step S2313, the position code and the semantic code are fused to obtain the initial encoding vector.

According to the above embodiments, the position information and the category information of the map element are encoded separately, and encoding results are fused, so that a capability of expressing the map element can be improved.

According to some embodiments, in step S2311, the position information may be encoded by a trained position encoder. The position encoder may be implemented as, for example, a neural network.

According to some embodiments, as described above, the map element includes a road element and a surface element. Position information of the road element is represented as a four-dimensional vector, and position information of the surface element is represented as a seven-dimensional vector. The road element and the surface element may be encoded by different position encoders separately, to achieve better encoding effect.

According to some embodiments, the position information of the road element may be encoded by a first position encoder. The road element includes the lane line, the curb, the crosswalk, the stop line, the traffic sign, and the pole. Position information of an ith road element is represented as $$M_i^{hd}(1 \le i \le K^{hd}),$$

where $K^{hd}$ represents the number of road elements for positioning the vehicle. The position information $$M_i^{hd}$$

of the road element is normalized according to the following formula (1) based on xy coordinates $O_{xy}=[x_o\ y_o]^T$ of the initial pose in the UTM coordinate system and a range $R_{xy}=[x_r\ y_r]^T$ of xy directions of the point cloud:

$$\hat{M}_i^{hd} = \frac{M_i^{hd} - O_{xy}}{R_{xy}} \tag{1}$$

In formula (1), $$\hat{M}_i^{hd}$$

is normalized position information.

The normalized position information $$\hat{M}_i^{hd}$$

is encoded by the first position encoder to obtain a position code $$E_{hd,i}^{pos} \in \mathbb{R}^C,$$

where C is the dimension of the position code, and is usually equal to the channel number of the environmental feature map, that is, is equal to the dimension of the feature vector of each pixel in the environmental feature map. The first position encoder may be implemented as a multi-layer perceptron (MLP). The first position encoder may include, for example, a group of one-dimensional convolutional layers, batch normalization layers, and activation function layers, which are in order of Conv1D(4,32,1), BN(32), ReLU, Conv1D(32,64,1), BN(64), ReLU, Conv1D(64,128, 1), BN(128), ReLU, Conv1D(128,256,1), BN(256), ReLU, and Conv1D(256, 256,1).

According to some embodiments, the position information of the surface element may be encoded by a second position encoder. Position information of an ith surface element is represented as $$M_i^{surfel} = \begin{bmatrix} p_x & p_y & n^T & r^T \end{bmatrix}^T \in \mathbb{R}^7(1 \le i \le K^{surfel}),$$

where $p_x$ and $p_y$ are xy coordinates of the surface element in the UTM coordinate system respectively, n is a unit normal vector of the surface element, $$r = \begin{bmatrix} \frac{\lambda_1}{\lambda_2} & \frac{\lambda_1}{\lambda_3} \end{bmatrix}^T, \lambda_1 \le \lambda_2 \le \lambda_3$$

are singular values of a covariance matrix of the surface element, and $K^{surfel}$ is the number of surface elements for positioning the vehicle. The position information $$M_i^{surfel}$$

of the surface element is normalized according to the following formula (2) based on the xy coordinates $O_{xy}=[x_o\ y_o]^T$ of the initial pose in the UTM coordinate system and the range $R_{xy}=[x_r\ y_r]^T$ of the xy directions of the point cloud:

$$\hat{M}_i^{surfel} = \left[\frac{p_x - x_o}{x_r} \quad \frac{p_y - y_o}{y_r} \quad n^T \quad r^T\right]^T \tag{2}$$

In formula (2), $$\hat{M}_i^{surfel}$$

is normalized position information.

The normalized position information $$\hat{M}_i^{surfel}$$

is encoded by the second position encoder to obtain a position code $$E_{surfel,i}^{pos} \in \mathbb{R}^C,$$

where C is the dimension of the position code, and is usually equal to the channel number of the environmental feature map, that is, is equal to the dimension of the feature vector of each pixel in the environmental feature map. Like the first position encoder, the second position encoder may also be implemented as a multi-layer perceptron. The second position encoder may include, for example, a group of one-dimensional convolutional layers, batch normalization layers, and activation function layers, which are in order of Conv1D(7,32,1), BN(32), ReLU, Conv1D(32,64,1), BN(64), ReLU, Conv1D(64,128,1), BN(128), ReLU, Conv1D(128,256,1), BN(256), ReLU, and Conv1D(256, 256,1).

Position codes of all the map elements have the same dimension C. C may be set to, for example, 256. The position code of the map element is uniformly represented as $$E_i^{pos} \in \mathbb{R}^C (1 \le i \le K),$$

where K is the number of map elements for positioning the vehicle. It can be understood that $K=K^{surfel}+K^{hd}$.

According to some embodiments, in step S2312, the semantic code of the map element may be determined based on a correspondence between a plurality of category information and a plurality of semantic codes. The plurality of semantic codes are parameters of a positioning model, and are obtained by training the positioning model.

According to the above embodiments, the semantic code is trainable, so that the capability of the semantic code in expressing the category information of the map element can be improved, and the positioning precision is improved. A training manner for the semantic code is described in detail in the following positioning model training method 600 in the following embodiments.

A semantic code $$E_j^{sem}$$

of a jth category information may be determined according to the following formula (3):

$$E_j^{sem} = f(j),\ j \in \{1, 2, \ldots, N_e\},\ E_j^{sem} \in \mathbb{R}^C, \tag{3}$$

where f( ) represents a mapping relationship between the category information and the semantic code, j is the serial number of the category information, $N_e$ is an amount of category information, and C is the dimension (the same as that of the position code) of the semantic code. According to some embodiments, as described above, there are seven map elements including the lane line, the curb, the crosswalk, the stop line, the traffic sign, the pole, and the surface element. Correspondingly, $N_e=7$. Serial numbers 1 to 7 of the category information correspond to the seven map elements respectively.

A map element set is denoted as $\{M_i|i=1, 2, \ldots, K\}$, where K is the number of map elements. The category information of each map element is denoted as $s_i$. The semantic code $$E_{s_i}^{sem}$$

of each map element may be obtained according to formula (3).

After the position code and the semantic code of the map element are obtained in steps S2311 and S2312, the position code and the semantic code may be fused in step S2313 to obtain the initial encoding vector of the map element.

According to some embodiments, a sum of the position code and the semantic code may be used as the initial encoding vector of the map element.

According to some other embodiments, a weighted sum of the position code and the semantic code may be used as the initial encoding vector of the map element.

After the initial encoding vector of the map element is obtained by step S231, in step S232, the initial encoding vector is updated based on the environmental feature to obtain the target encoding vector of the map element. A set of the target encoding vectors of the map elements is the map feature.

According to some embodiments, in the situation that the environmental feature includes a plurality of environmental feature maps of different sizes in the target three-dimensional space, in step S232, the initial encoding vector may be updated based on only the environmental feature map of a minimum size in the plurality of environmental feature maps. In this way, the calculation efficiency can be improved.

For example, in the example described for step S2233, the environmental feature includes the first environmental feature map whose size is 160*160*256 and the two second environmental feature maps whose sizes are 320*320*128 and 640*640*64 respectively. The initial encoding vector of the map element is updated based on only the environmental feature map of a minimum size, that is, the first environmental feature map.

According to some embodiments, in step S232, at least one update may be performed on the initial encoding vector of the map element using the environmental feature based on attention mechanism, to obtain the target encoding vector.

The environmental feature is located in the target three-dimensional space (BEV space). According to the above embodiments, the at least one update is performed on the initial encoding vector of the map element using the environmental feature, so that the encoding vector of the map element can be transformed to the target three-dimensional space to obtain the target encoding vector in the target three-dimensional space. In addition, the attention mechanism can capture a correlation between features. According to the above embodiments, the encoding vector of the map element is updated using the attention mechanism, so that accuracy of the target encoding vector can be improved.

According to some embodiments, the following steps S2321 and S2322 are performed in each update of the at least one update.

In step S2321, a current encoding vector is updated based on self-attention mechanism, to obtain an updated encoding vector.

In step S2322, the updated encoding vector and the environmental feature are fused based on cross-attention mechanism, to obtain a fused encoding vector.

It should be noted that the current encoding vector in the first update is the initial encoding vector obtained in step S231. To be specific, in the first update, the current encoding vector $Q_i$ of an ith map element may be initialized to:

$$Q_i = E_i^{pos} + E_{s_i}^{sem} \quad (4)$$

The current encoding vector in the second update or each subsequent update is the fused encoding vector obtained by the previous update. For example, the current encoding vector in step S2321 in the second update is the fused encoding vector obtained in step S2322 in the first update.

The fused encoding vector obtained by the last update is used as the target encoding vector of the map element in the target three-dimensional space.

The map feature is the set of the target encoding vectors of the map elements, that is, the map feature is $$M^{emb} = \{M_i^{emb} \in \mathbb{R}^C \mid i = 1, 2, \ldots, K\},$$

where $$M_i^{emb}$$

is the target encoding vector of the ith map element, C is the dimension of the target encoding vector, and K is the number of map elements.

According to some embodiments, for step S2321, the current encoding vector of each map element may be used as a query vector (Query), and a correlation (that is, an attention weight) between the map element and another map element may be obtained based on self-attention mechanism. Then, the current encoding vector of the map element and the current encoding vectors of other map elements are fused based on the correlation between the map element and other map elements, to obtain an updated encoding vector of the map element.

According to some embodiments, the self-attention mechanism in step S2321 may be a multi-head attention mechanism, and is configured to collect information among query vectors of the map elements. According to some embodiments, the current encoding vector of the map element may be updated according to the following formula (5):

$$SA(Q_i) = \sum_{m=1}^{M} W_m \sum_{j=1}^{K} A_m(Q_i, Q_j) W'_m Q_j \quad (5)$$

$SA(Q_i)$ represents an encoding vector updated based on the self-attention (SA) mechanism. M represents the number of attention heads. $W_m$ and $$W'_m$$

represent learnable projection matrices (trainable parameters of the positioning model). $A_m(Q_i, Q_j)$ represents an attention weight between an encoding vector $Q_i$ and an encoding vector $Q_j$, and satisfies $$\sum_{j=1}^{K} A_m(Q_i, Q_j) = 1.$$

According to some embodiments, in step S2322, the deformable attention mechanism may be used, and the encoding vector of the map and the environmental feature are fused using the environmental feature map of the minimum size according to the following formula (6):

$$CA(Q_i, F_0^B) = DA(Q_i, r_i^B, F_0^B + B_0^{pos}) \quad (6)$$

$$CA(Q_i, F_0^B)$$

represents an encoding vector obtained by fusing the encoding vector $Q_i$ and the zeroth-layer environmental feature map (that is, the environmental feature map of the minimum size)

$$F_0^B$$

in the target three-dimensional space (BEV space) based on the cross-attention (CA) mechanism. DA represents the deformable attention mechanism.

$$r_i^B \in \mathbb{R}^2$$

represents a position of the reference point. An initial value of the reference point is position coordinates to which the map element is projected in the target three-dimensional space.

$$B_0^{pos}$$

represents a position code of the zeroth-layer environmental feature map.

According to some embodiments, step S232 may be implemented by a trained second transformer decoder. Specifically, the initial encoding vector of each map element and the environmental feature may be input to the trained second transformer decoder to obtain the target encoding vector of each map element output by the second transformer decoder, that is, the map feature.

According to some embodiments, the second transformer decoder includes at least one transformer layer, and each transformer layer is configured to perform one update on the encoding vector of the map element.

Further, each transformer layer may include one self-attention module and one cross-attention module. The self-attention module is configured to update the current encoding vector of the map element to obtain the updated encoding vector, that is, is configured to implement step S2321. The cross-attention module is configured to fuse the updated encoding vector and the environmental feature to obtain the fused encoding vector, that is, is configured to implement step S2322.

After the environmental feature and the map feature are obtained by step S220 and step S230 respectively, the target pose offset for correcting the initial pose is determined in step S240 based on the environmental feature and the map feature.

According to some embodiments, the environmental feature may be matched with the map feature to determine the target pose offset.

According to some embodiments, the environmental feature includes at least one environmental feature map in the target three-dimensional space, and the at least one environmental feature map is of a different size. Correspondingly, step S240 may include steps S241 to S243.

In step S241, the at least one environmental feature map is arranged in ascending order of sizes. To be specific, the at least one environmental feature map is arranged in ascending order of layer numbers. An arrangement result may be, for example, the zeroth-layer environmental feature map, a first-layer environmental feature map, a second-layer environmental feature map, . . . .

The following steps S242 and S243 are performed for any environmental feature map of the at least one environmental feature map.

In step S242, the environmental feature map is matched with the map feature to determine a first pose offset.

In step S243, a current pose offset and the first pose offset are superimposed to obtain an updated pose offset.

The current pose offset corresponding to the first environmental feature map is an all-zero vector. The current pose offset corresponding to the second environmental feature map or each subsequent environmental feature map is the updated pose offset corresponding to the previous environmental feature map. The target pose offset is the updated pose offset corresponding to the last environmental feature map.

According to the above embodiments, a pose offset is calculated for each environmental feature map in ascending order of sizes of the environmental feature maps, so that pose offset estimation precision and accuracy can be improved gradually, and the accuracy of the target pose offset is improved.

According to some embodiments, step S242 further includes steps S2421 to S2423.

In step S2421, sampling is performed within a preset offset sampling range to obtain a plurality of candidate pose offsets.

In step S2422, for any candidate pose offset of the plurality of candidate pose offsets, a matching degree between the environmental feature map and the map feature in a case of the candidate pose offset is determined.

In step S2423, the plurality of candidate pose offsets are fused based on the matching degree corresponding to each candidate pose offset of the plurality of candidate pose offsets, to obtain the first pose offset.

According to some embodiments, in step S2421, uniform sampling may be performed at a specific sampling interval within the preset offset sampling range to obtain the plurality of candidate pose offsets.

According to some embodiments, a size of the offset sampling range is negatively correlated with the size of the environmental feature map. In addition, a same number of candidate pose offsets are sampled for environmental feature maps of different sizes. According to this embodiment, if an environmental feature map has a larger size and a higher resolution, the offset sampling range and the sampling interval are smaller, and sampling precision is higher. Therefore, precision of sampling the candidate pose offsets can be improved, and the pose offset estimation precision is improved.

For example, the environmental feature includes $l(l \in \{0, 1, 2\})$ layers of environmental feature maps. In this case, for the lth-layer environmental feature map, a three-degree-of-freedom candidate pose offset $$\Delta T_{pqr}^l$$

obtained through sampling at equal intervals in x, y, and yaw directions is:

$$\left\{\Delta T_{pqr}^l = [\Delta x_p^l \ \Delta y_q^l \ \Delta\psi_r^l]^T \in \left[-\frac{r_x}{2^l}, \frac{r_x}{2^l}\right] \times \left[-\frac{r_y}{2^l}, \frac{r_y}{2^l}\right] \times \left[-\frac{r_{yaw}}{2^l}, \frac{r_{yaw}}{2^l}\right] \middle| 1 \le p, q, r \le N_s\right\} \quad (7)$$

$r_x$ represents an offset sampling range in the x direction. $r_y$ represents an offset sampling range in the y direction. $r_{yaw}$ represents an offset sampling range in the yaw direction (yaw angle). $N_s$ represents a maximum sampling number in each direction. For example, it may be specified that $r_x$=3m, $r_y$=3m, $r_{yaw}$=3°, and $N_s$=7. Correspondingly, for each layer of environmental feature map, 343 candidate pose offsets may be obtained through sampling.

According to some embodiments, as described above, the map feature includes the respective target encoding vectors of the plurality of map elements. Correspondingly, step S2422 may include steps S24221 to S24224.

In step S24221, a current pose and the candidate pose offset are superimposed to obtain a candidate pose.

For example, a current pose corresponding to the lth-layer environmental feature map is $T_{est}$, and the candidate pose offset is $$\Delta T^{l}_{pqr}.$$

In this case, the candidate pose $$T^{l}_{pqr}$$

is $$T^{l}_{pqr} = T_{est} \oplus \Delta T^{l}_{pqr}.$$

$\oplus$ represents a generalized addition operation between poses.

It should be noted that the current pose is a sum of the initial pose and the first pose offset(s) corresponding to each environmental feature map before the current environmental feature map.

For example, the current pose corresponding to the zeroth-layer environmental feature map is the initial pose, the current pose corresponding to the first-layer environmental feature map is a sum of the initial pose and the first pose offset corresponding to the zeroth-layer environmental feature map, and the current pose corresponding to the second-layer environmental feature map is a sum of the initial pose and respective first pose offsets corresponding to the zeroth-layer environmental feature map and the first-layer environmental feature map.

Steps S24222 and S24223 are performed for any map element of the plurality of map elements.

In step S24222, the map element is projected to the target three-dimensional space (BEV space) based on the candidate pose, to obtain an environmental feature vector corresponding to the map element in the environmental feature map.

According to some embodiments, to unify dimensions of the target encoding vector of the map element and the environmental feature vector, one one-dimensional convolutional layer and one two-dimensional convolutional layer may be used to project the target encoding vector and the lth-layer environmental feature map respectively, to convert the target encoding vector and the lth-layer environmental feature map to a same dimension $$\frac{C}{2^{l}}.$$

C may be, for example, 256. A projected target encoding vector is $$\hat{M}^{emb,l}_{i}.$$

A projected environmental feature map is $$\hat{F}^{B}_{l}.$$

According to some embodiments, coordinates of the map element may be projected to the BEV space by using the candidate pose $$T^{l}_{pqr},$$

to obtain projected coordinates $$p^{B,l}_{i}(i \in \{1, 2, \ldots, K\})$$

of the map element in the BEV space. Further, the environmental feature map $$\hat{F}^{B}_{l}$$

may be interpolated through an interpolation algorithm (for example, a bilinear interpolation algorithm) to obtain a feature vector of the environmental feature map at the projected coordinates $$p^{B,l}_{i},$$

that is, an environmental feature vector $$M^{bev,l}_{i}(T^{l}_{pqr}).$$

In step S24223, a similarity between the target encoding vector of the map element and the corresponding environmental feature vector is calculated.

According to some embodiments, the similarity between the target encoding vector and the environmental feature vector may be calculated based on a dot product of the two. For example, a similarity $$S_{i}(T^{l}_{pqr})$$

between the target encoding vector $$\hat{M}^{emb,l}_{i}$$

of the ith map element and the corresponding environmental feature vector $$M_i^{bev,l}(T_{pqr}^l)$$

may be calculated according to the following formula (8):

$$S_i(T_{pqr}^l) = h\left(M_i^{bev,l}(T_{pqr}^l) \odot \hat{M}_i^{emb,l}\right) \quad (8)$$

$\odot$ represents the dot product, and h( ) represents a learnable multi-layer perceptron (MLP). The multi-layer perceptron may include a group of one-dimensional convolutional layers, normalization layers, and activation layers, which may be in order of, for example, Conv1D(1,8,1), BN(8), LeakyReLU(0.1), Conv1D(8,8,1), BN(8), LeakyReLU(0.1), and Conv1D(8,1,1).

In step S24224, the matching degree between the environmental feature map and the map feature in the case of the candidate pose offset is determined based on the similarity corresponding to each map element of the plurality of map elements.

According to some embodiments, a sum or an average value of the similarities corresponding to the map elements may be determined as the matching degree between the environmental feature map and the map feature in the case of the candidate pose offset.

For example, a matching degree between the lth-layer environmental feature map and the map feature in the case of the candidate pose offset $$\Delta T_{pqr}^l$$

may be calculated according to the following formula (9):

$$S_l(\Delta T_{pqr}^l) = S_l(T_{pqr}^l) = \frac{1}{K}\sum_{i=1}^{K} h\left(M_i^{bev,l}(T_{pqr}^l) \odot \hat{M}_i^{emb,l}\right) \quad (9)$$

K is the number of map elements.

According to step S2422, the matching degree between the environmental feature map and the map feature in a case of each candidate pose offset may be obtained. Then, in step S2423, the plurality of candidate pose offsets may be fused based on the matching degrees respectively corresponding to the plurality of candidate pose offsets, to obtain the first pose offset.

According to some embodiments, step S2423 may include step S24231 and step S24232.

In step S24231, for any candidate pose offset of the plurality of candidate pose offsets, a probability of the candidate pose offset is determined based on a ratio of the matching degree corresponding to the candidate pose offset to a sum of the matching degrees corresponding to the plurality of candidate pose offsets.

In step S24232, an expectation of the plurality of candidate pose offsets is determined as the first pose offset.

According to the above embodiments, a probability (posterior probability) of each candidate pose offset is calculated based on the matching degrees, and candidate pose offsets are fused based on the posterior probability, so that interpretability is high, and it is easy to analyze a cause for a positioning failure and explore a direction in which the positioning precision can be further improved.

According to some embodiments, the probability $$p_l(\Delta T_{pqr}^l|X)$$

of the candidate pose offset in the case of the current positioning condition X may be calculated according to the following formula (10):

$$p_l(\Delta T_{pqr}^l \mid X) = \frac{\exp(S_l(T_{pqr}^l))}{\sum_{1\le p,q,r\le N_s}\exp(S_l(T_{pqr}^l))} \quad (10)$$

Correspondingly, the first pose offset $$\Delta T_{est}^l$$

and the covariance $\Sigma_l$ corresponding to the $l^{th}$-layer environmental feature map are calculated according to the following formula (11) and formula (12) respectively:

$$\Delta T_{est}^l = \sum_{1\le p,q,r\le N_s} p_l(\Delta T_{pqr}^l \mid X)\Delta T_{pqr}^l \quad (11)$$

$$\Sigma_l = \sum_{1\le p,q,r\le N_s} p_l(\Delta T_{pqr}^l \mid X)(\Delta T_{pqr}^l - \Delta T_{est}^l)(\Delta T_{pqr}^l - \Delta T_{est}^l)^T \quad (12)$$

Further, the current pose $T_{est}$ and the current pose offset $\Delta T_{est}$ may be updated based on the first pose offset $$\Delta T_{est}^l.$$

To be specific:

$$T_{est} \leftarrow T_{est} \oplus \Delta T_{est}^l,\ \Delta T_{est} \leftarrow \Delta T_{est} + \Delta T_{est}^l \quad (13)$$

The arrow $\leftarrow$ represents assigning the calculation result $$T_{est} \oplus \Delta T_{est}^l$$

on the right side of the arrow to the variable $T_{est}$.

Figure 3:
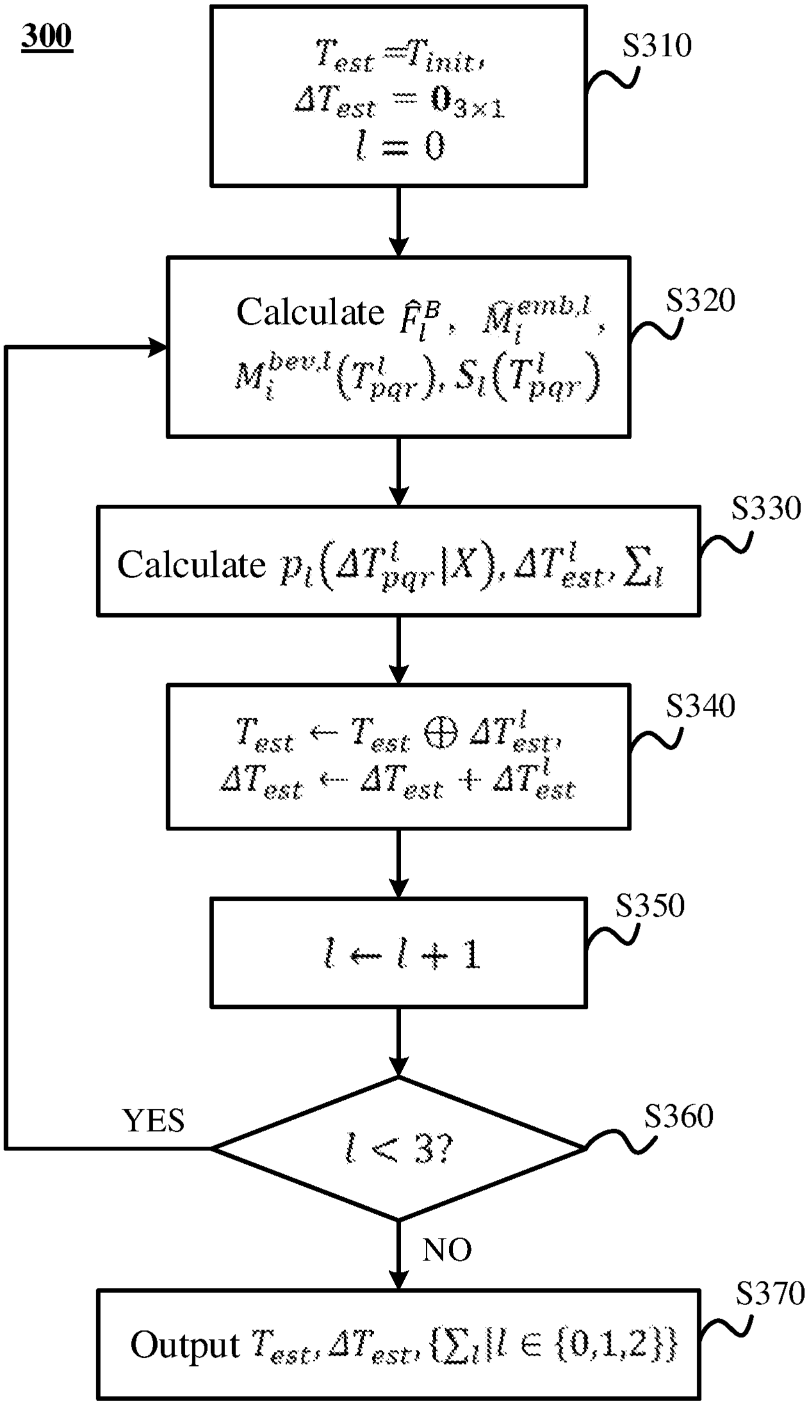
FIG. 3 is a flowchart of calculating a target pose offset according to some embodiments of the present disclosure.

FIG. 3 is a flowchart of a process 300 of calculating the target pose offset according to some embodiments of the present disclosure. In the embodiments shown in FIG. 3, the environmental feature includes three layers of environmental feature maps in the BEV space, that is, l=0,1,2.

As shown in FIG. 3, in step S310, the current pose $T_{est}$ is initialized to an initial pose $T_{init}$, the current pose offset $\Delta T_{est}$ is initialized to an all-zero vector, and the layer number 1 of the environmental feature map is initialized to 0.

In step S320, for the lth-layer environmental feature map, the target encoding vector of the map element i and the environmental feature map are first projected to the same dimension to obtain the projected environmental feature map $$\hat{F}_l^B$$

and the projected target encoding vector $$\hat{M}_i^{emb,l}.$$

The map element is mapped to the BEV space to obtain the environmental feature vector $$M_i^{bev,l}(T_{pqr}^l)$$

corresponding to the map element. The matching degree $$S_l(T_{pqr}^l)$$

between the lth-layer environmental feature map and the map feature in the case of the candidate pose $$T_{pqr}^l$$

(that is, in the case of the candidate pose offset $$\Delta T_{pqr}^l)$$

is determined according to formula (9) based on the target encoding vector of each map element and the environmental feature vector.

In step S330, the probability $$p_l(\Delta T_{pqr}^l|X)$$

of each candidate pose offset, the first pose offset $$\Delta T_{est}^l,$$

and the covariance $\Sigma_l$ are calculated according to formula (10) to formula (12).

In step S340, the current pose $T_{est}$ and the current pose offset $\Delta T_{est}$ are updated according to formula (13).

In step S350, a value of 1 is increased by one.

In step S360, whether 1 is less than 3 is determined. If 1 is less than 3, step S320 is performed; or if 1 is not less than 3, step S370 is performed, and the current pose $T_{est}$, the current pose offset $\Delta T_{est}$, and the covariance $\{\Sigma_l \in \{0,1,2\}\}$ of each layer are output.

The current pose offset $\Delta T_{est}$ output in step S370 is the target pose offset for correcting the initial pose.

According to some embodiments, step S240 may be implemented by a trained pose solver. Specifically, the environmental feature, the map feature, and the initial pose are input to the trained pose solver, to obtain the target pose offset output by the pose solver.

Corresponding to the environmental feature including the at least one environmental feature map, the pose solver may also include at least one solving layer. The at least one solving layer corresponds to the at least one environmental feature map respectively. Each solving layer is configured to process a corresponding environmental feature map, so as to update the current pose offset. An updated pose offset output by the last solving layer is the target pose offset for correcting the initial pose of the vehicle.

In step S250, the initial pose and the target pose offset are superimposed to obtain the corrected pose of the vehicle.

Figure 4:
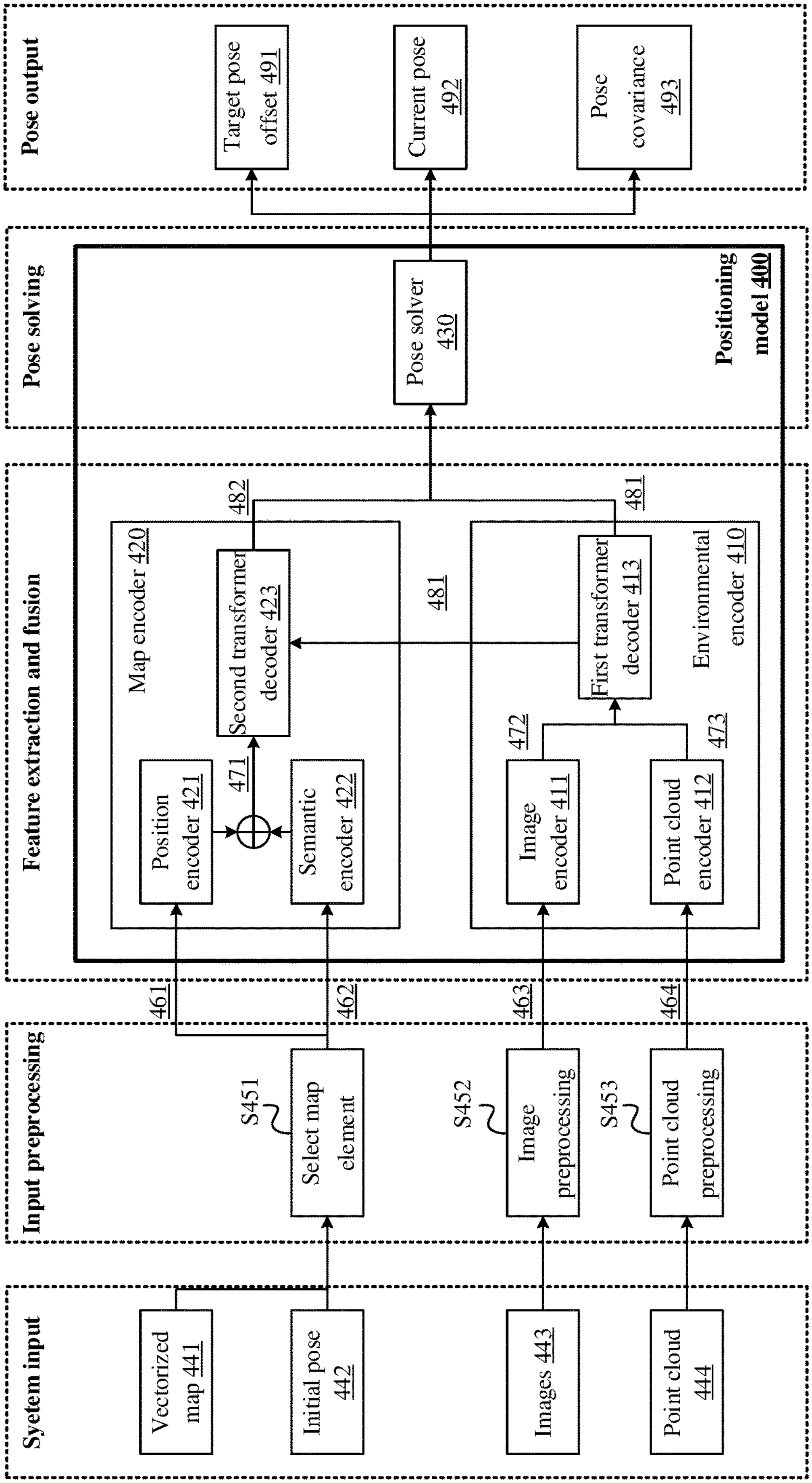
FIG. 4 is a schematic diagram of a vehicle positioning process based on a trained positioning model according to some embodiments of the present disclosure.

The vehicle positioning method 200 in the embodiments of the present disclosure may be implemented by a trained positioning model. FIG. 4 is a schematic diagram of a vehicle positioning process based on a trained positioning model 400 according to some embodiments of the present disclosure.

In the vehicle positioning process shown in FIG. 4, an input of a vehicle positioning system is first obtained. The system input includes a vectorized map 441 for positioning a vehicle, a six-degree-of-freedom initial pose 442 (including three-dimensional coordinates and three attitude angles) of the vehicle, images 443 acquired by six cameras deployed in a surround-view direction, and a point cloud 444 acquired by a lidar. The initial pose 442 may be a pose output by the integrated positioning system at a current moment, or may be a corrected pose of a previous moment.

After the system input is obtained, the input is preprocessed. As shown in FIG. 4, preprocessing includes steps S451 to S453.

In step S451, a map element near the initial pose 442 is selected from the vectorized map 441, and position information 461 and semantic information (that is, category information) 462 of the map element are obtained.

In step S452, the image 443 is preprocessed to obtain a preprocessed image 463. The preprocessing operation on the image may include undistortion, scaling to a preset size, standardization, and the like.

In step S453, the point cloud 444 is preprocessed to obtain a preprocessed point cloud 464. A preprocessing operation on the point cloud may include screening the point cloud based on the initial pose and retaining only a point cloud near the initial pose. For example, only point clouds that use the initial pose 442 as an origin within a range of [−40 m, 40 m] in the forward direction of the vehicle (an x-axis positive direction), [−40 m, 40 m] in a left direction of the vehicle (a y-axis positive direction), and [−3 m, 5 m] above the vehicle (in a z-axis positive direction) may be retained. Further, the point cloud may be voxelized. To be specific, a space may be divided into a plurality of non-intersecting blocks, and at most 32 points are retained in each block.

After the preprocessing operation, feature extraction and pose solving are implemented by the positioning model 400. As shown in FIG. 4, the positioning model 400 includes an environmental encoder 410, a map encoder 420, and a pose solver 430.

The environmental encoder 410 is configured to encode multi-modal sensor data. The environmental encoder 410 includes an image encoder 411, a point cloud encoder 412, and a first transformer decoder 413. The image encoder 411 is configured to encode the preprocessed image 463 to obtain an image feature map 472. The point cloud encoder 412 is configured to encode the preprocessed point cloud 464 to obtain a point cloud feature map 473 in a BEV space. The first transformer decoder 413 is configured to fuse the image feature map 472 and the point cloud feature map 473 in the BEV space to obtain an environmental feature 481 in the BEV space.

The map encoder 420 is configured to encode each map element. The map encoder 420 includes a position encoder 421, a semantic encoder 422, and a second transformer decoder 423. The position encoder 421 is configured to encode the position information 461 of the map element to obtain a position code. The semantic encoder 422 is configured to encode the semantic information 462 of the map element to obtain a semantic code. The position code and the semantic code are added to obtain an initial encoding vector 471 of the map element. The second transformer decoder 423 updates an initial encoding vector 471 of each map element based on the environmental feature 481 to map the initial encoding vector 471 to the BEV space to obtain a target encoding vector 482 of each map element in the BEV space, that is, a map feature.

The pose solver 430 uses the environmental feature 481, the map feature 482, and the initial pose 442 as an input, performs a series of processing (processing in step S240), and outputs a target pose offset 491, a current pose 492 (that is, a corrected pose obtained by correcting the initial pose 442 by using the target pose offset 491), and a pose covariance 493.

According to some embodiments of the present disclosure, a vectorized map construction method is further provided. A vectorized map constructed according to the method may be used in the above vehicle positioning method 200.

Figure 5:
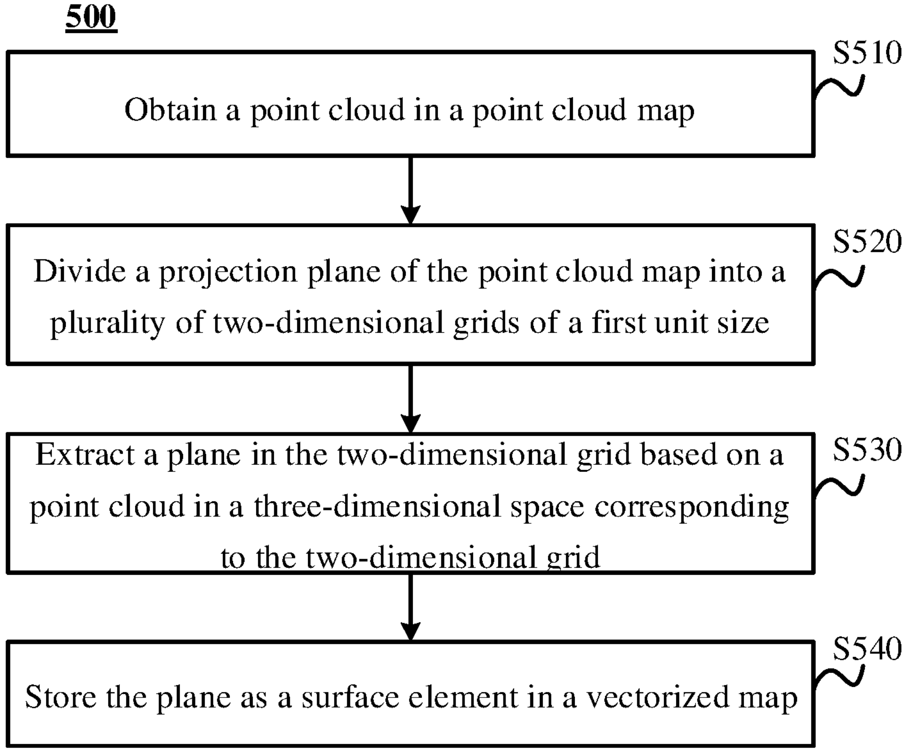
FIG. 5 is a flowchart of a vectorized map construction method according to some embodiments of the present disclosure.

FIG. 5 is a flowchart of a vectorized map construction method 500 according to some embodiments of the present disclosure. The method 500 is usually performed by a server (for example, the server 120 shown in FIG. 1). In some cases, the method 500 may alternatively be performed by an autonomous vehicle (for example, the motor vehicle 110 shown in FIG. 1). As shown in FIG. 5, the method 500 includes steps S510 to S540.

In step S510, a point cloud in a point cloud map is obtained.

In step S520, a projection plane of the point cloud map is divided into a plurality of two-dimensional grids of a first unit size.

Steps S530 and S540 are performed for any two-dimensional grid of the plurality of two-dimensional grids.

In step S530, a plane in the two-dimensional grid is extracted based on a point cloud in a three-dimensional space corresponding to the two-dimensional grid.

In step S540, the plane is stored as a surface element in a vectorized map.

According to the embodiments of the present disclosure, the plane is extracted from the point cloud map, and the extracted plane is stored as the surface element in the vectorized map, so that richness and a density of geographical elements in the vectorized map can be improved, and precision of positioning a vehicle is improved.

The vectorized map is far smaller than the point cloud map, and is convenient to update. The vectorized map (not the point cloud map) is stored to the vehicle, so that storage costs of the vehicle can be reduced greatly, applicability of the vehicle positioning method can be improved, and a mass production need can be satisfied. It is verified by an experiment that a size of the vectorized map is about 0.35 M/km. Compared with that of the point cloud map, the size of the vectorized map is reduced by 97.5%.

Each step of the method 500 is described in detail below.

In step S510, the point cloud in the point cloud map is obtained.

The point cloud map represents a geographical element by using a dense point cloud. The vectorized map represents a geographical element by using an identifier, a name, a position, an attribute, a topological relationship therebetween, and other information.

In step S520, the projection plane of the point cloud map is divided into the plurality of two-dimensional grids of the first unit size.

The projection plane of the point cloud map is an xy plane. The first unit size may be set as required. For example, the first unit size may be set to 1 m*1 m or 2 m*2 m.

In step S530, the plane in the two-dimensional grid is extracted based on the point cloud in the three-dimensional space corresponding to the two-dimensional grid. The three-dimensional space corresponding to the two-dimensional grid is a columnar space using the two-dimensional grid as a section.

According to some embodiments, step S530 may include steps S531 to S534.

In step S531, the three-dimensional space is divided into a plurality of three-dimensional grids of a second unit size in a height direction. The second unit size may be set as required. For example, the second unit size may be set to 1 m*1 m*1 m or 2 m*2 m*2 m.

Steps S532 and S533 are performed for any three-dimensional grid of the plurality of three-dimensional grids.

In step S532, a confidence level that the three-dimensional grid includes a plane is calculated based on a point cloud in the three-dimensional grid.

In step S533, the plane in the three-dimensional grid is extracted in response to the confidence level being greater than a threshold. The threshold may be set as required. For example, the threshold may be set to 10 or 15.

In step S534, a plane with a maximum confidence level in the plurality of three-dimensional grids is determined as the plane corresponding to the two-dimensional grid.

According to some embodiments, for step S532, the confidence level that the three-dimensional grid includes the plane may be calculated according to the following steps: singular value decomposition is performed on a covariance matrix of the point cloud in the three-dimensional grid to obtain a first singular value $\lambda_1$, a second singular value $\lambda_2$, and a third singular value $\lambda_3$, where the first singular value is less than or equal to the second singular value, and the second singular value is less than or equal to the third singular value, that is, $\lambda_1 \le \lambda_2 \le \lambda_3$; and a ratio $\lambda_2/\lambda_1$ of the second singular value to the first singular value is determined as the confidence level s, that is, $s=\lambda_2/\lambda_1$.

According to the above embodiments, if $\lambda_2/\lambda_1$ is great, it is considered that a change (variance) of point cloud data in a feature vector direction corresponding to $\lambda_1$ is small relative to that in another direction, and can be ignored, so that the point cloud can be approximately a plane. $\lambda_2/\lambda_1$ can indicate a probability that the three-dimensional grid includes the plane, and thus can be used as the confidence level that the three-dimensional grid includes the plane.

In step S540, the plane is stored as the surface element in the vectorized map. According to some embodiments, an identifier of the surface element corresponding to the plane may be determined, and coordinates of a point on the plane and a unit normal vector of the plane may be stored in association with the identifier.

According to some embodiments, the identifier of the surface element may be generated according to a preset rule. It can be understood that identifiers of surface elements in the vectorized map are different.

According to some embodiments, a centroid of the point cloud in the three-dimensional grid that the plane belongs to may be used as the point on the plane, and the coordinates of the point are stored. The unit normal vector of the plane is obtained by unitizing a feature vector corresponding to the first singular value $\lambda_1$.

In the vectorized map, a surface element P may be represented as, for example, $P=[p^T\ n^T\ r^T]^T \in \mathbb{R}^7$, where $\mathbb{R}$ represents a real number field, $p \in \mathbb{R}^2$ represents xy coordinates of a point on the surface element P in a UTM coordinate system, $n \in \mathbb{R}^3$ represents a unit normal vector of the surface element, and $$r = \left[\frac{\lambda_1}{\lambda_2}\ \ \frac{\lambda_1}{\lambda_3}\right]^T, \lambda_1 \le \lambda_2 \le \lambda_3$$

are singular values of a covariance matrix of the surface element.

According to some embodiments, in addition to the surface element, the vectorized map further stores other geographical elements in a vector form. These geographical elements include for example, a road element, a lane line, a curb, a crosswalk, a stop line, a traffic sign, and a pole.

In the vectorized map, the lane line, the curb, and the stop line are represented in a form of a line segment, and endpoints of the line segment are two-dimensional xy coordinates in the UTM coordinate system. The crosswalk is represented as a polygon, and vertices of the polygon are represented by two-dimensional xy coordinates in the UTM coordinate system. The traffic sign is represented as a rectangle perpendicular to an xy plane, and vertices are three-dimensional UTM coordinates, where a z coordinate is represented by a height relative to the ground. The pole is represented by two-dimensional xy coordinates in the UTM coordinate system and a height of the pole.

According to some embodiments of the present disclosure, a positioning model training method is further provided. A positioning model trained according to the method may be used in the above vehicle positioning method 200.

Figure 6:
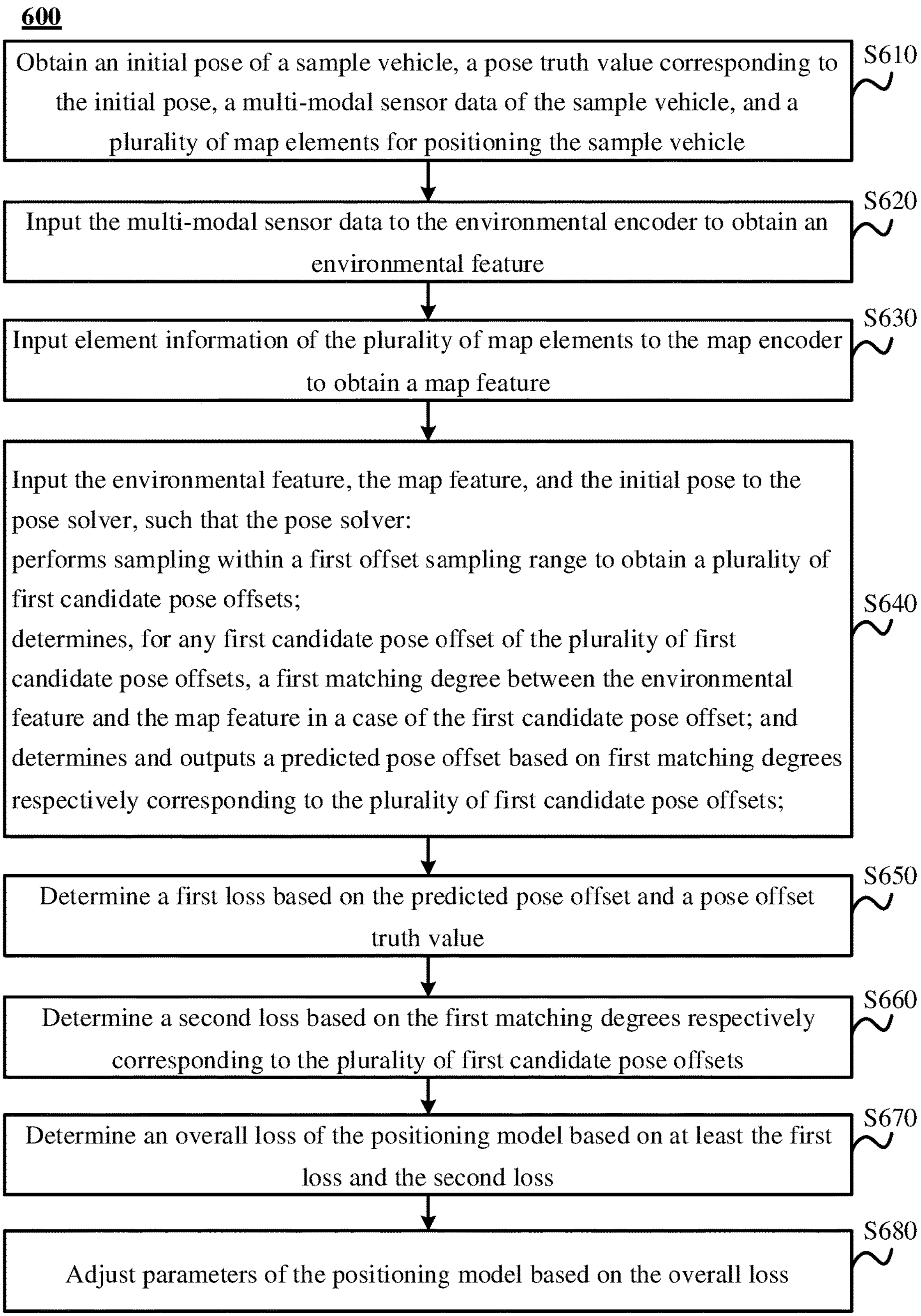
FIG. 6 is a flowchart of a positioning model training method according to some embodiments of the present disclosure.

FIG. 6 is a flowchart of a positioning model training method 600 according to some embodiments of the present disclosure. The method 600 is usually performed by a server (for example, the server 120 shown in FIG. 1). In some cases, the method 600 may alternatively be performed by an autonomous vehicle (for example, the motor vehicle 110 shown in FIG. 1). In the embodiments of the present disclosure, a positioning model includes an environmental encoder, a map encoder, and a pose solver. For an example structure of the positioning model, refer to FIG. 4.

As shown in FIG. 6, the method 600 includes steps S610 to S680.

In step S610, an initial pose of a sample vehicle, a pose truth value corresponding to the initial pose, a multi-modal sensor data of the sample vehicle, and a plurality of map elements for positioning the sample vehicle are obtained.

In step S620, the multi-modal sensor data is input to the environmental encoder to obtain an environmental feature.

In step S630, element information of the plurality of map elements is input to the map encoder to obtain a map feature.

In step S640, the environmental feature, the map feature, and the initial pose are input to the pose solver, such that the pose solver: performs sampling within a first offset sampling range to obtain a plurality of first candidate pose offsets; determines, for any first candidate pose offset of the plurality of first candidate pose offsets, a first matching degree between the environmental feature and the map feature in a case of the first candidate pose offset; and determines and outputs a predicted pose offset based on first matching degrees respectively corresponding to the plurality of first candidate pose offsets.

In step S650, a first loss is determined based on the predicted pose offset and a pose offset truth value, where the pose offset truth value is a difference between the pose truth value and the initial pose.

In step S660, a second loss is determined based on the first matching degrees respectively corresponding to the plurality of first candidate pose offsets, where the second loss indicates a difference between a predicted probability distribution of the pose truth value and a real probability distribution of the pose truth value.

In step S670, an overall loss of the positioning model is determined based on at least the first loss and the second loss.

In step S680, parameters of the positioning model is adjusted based on the overall loss.

According to the embodiments of the present disclosure, the first loss can guide the positioning model to output a more accurate predicted pose offset. The second loss can guide the predicted probability distribution of the pose truth value to be close to the real probability distribution of the pose truth value, so as to avoid a multimodal distribution. The overall loss of the positioning model is determined based on the first loss and the second loss, and the parameter of the positioning model is adjusted accordingly, so that positioning precision of the positioning model can be improved.

According to some embodiments, the initial pose may be a pose output by an integrated positioning system of the sample vehicle at a current moment, or may be a corrected pose of a previous moment.

According to some embodiments, the multi-modal sensor data includes an image and a point cloud. The plurality of map elements for positioning the sample vehicle may be geographical elements that are selected from a vectorized map and that are near the initial pose. The plurality of geographical elements include, for example, a road element (a lane line, a curb, a crosswalk, a stop line, a traffic sign, or a pole) and a surface element.

Steps S620 and S630 correspond to steps S220 and S230 described above respectively. The environmental encoder and the map encoder in steps S620 and S630 are configured to perform steps S220 and S230 respectively. For internal processing logic of the environmental encoder and the map encoder, refer to above related descriptions about steps S220 and S230. Details are not described herein again.

The pose solver in step S640 is configured to perform step S240 described above. For internal processing logic of the pose solver, refer to above related descriptions about step S240. Details are not described herein again.

The first loss is a pose mean square error loss. According to some embodiments, the first loss $L_{rmse}$ may be calculated according to the following formula:

$$L_{rmse} = \frac{1}{3}\sum_{l=0}^{2}\left\|\Lambda_l^{\frac{1}{2}} U_l^T\left(\Delta T_{est}^l - \Delta T_{gt}^l\right)\right\|_2 \quad (14)$$

l is a layer number of an environmental feature map (that is, a number of a solving layer of the pose solver). A matrix $U_l$ may be obtained by performing SVD on a covariance $$\sum\nolimits_l = U_l S U_l^t.\ \Lambda_l \in \mathbb{R}^{3\times 3}$$

is a diagonal matrix, and a value of a diagonal element of the matrix is a normalized value of a diagonal element of a diagonal matrix $$S^{-1}\cdot\Delta T^l_{est}$$

is a predicted pose offset output by the $l^{th}$ solving layer (that is, the first pose offset described in the method 200).

$$\Delta T^l_{gt}$$

is a pose offset truth value of the $l^{th}$ solving layer, that is, a difference between a pose truth value and the initial pose. It can be understood that pose offset truth values of all solving layers are the same.

It should be noted that if a 2-norm of $$\Delta T^l_{est} \text{ and } \Delta T^l_{gt}$$

is directly used as the first loss, impact on positioning in each direction is the same. However, impact on positioning in different directions is actually different. For example, in a lateral degradation scenario (for example, for a tunnel, there is no x-axis lateral constraint), a lateral positioning error is great, and it is difficult to improve positioning precision through optimization. Therefore, in this case, a lateral weight is expected to be reduced, to reduce impact of a lateral uncertainty on positioning precision. A weight in a direction is determined based on a covariance. According to formula (14), if a covariance in a specific direction is greater, an uncertainty is greater, a weight $$\Lambda_l^{\frac{1}{2}}U_l^T$$

in the direction is set to be smaller, and impact on the first loss is lower.

The second loss is a pose distribution KL divergence loss. According to some embodiments, the second loss $$L^{ps}_{KL}$$

may be calculated according to the following formulas:

$$\beta_l = -\log\frac{\exp\left(S_l\left(T^l_{gt}\right)\right)}{\sum_{1\le p,q,r\le N_s}\exp\left(S_l\left(T^l_{pqr}\right)\right)} \tag{15}$$

$$\gamma_l = \begin{cases} \beta_l & \beta_l \ge 0 \\ \exp(\beta_l)-1 & \beta_l < 0 \end{cases} \tag{16}$$

$$L^{ps}_{KL} = \frac{1}{3}\sum_{l=0}^{2}\gamma_l \tag{17}$$

$$T^l_{gt}$$

represents a pose truth value of the $l^{th}$ solving layer. It can be understood that pose truth values of all the solving layers are the same.

$$S_l\left(T^l_{gt}\right)$$

represents a matching degree between the $l^{th}$-layer environmental feature map and the map feature in a case of the pose truth value, and may be calculated with reference to formula (9).

$$S_l\left(T^l_{pqr}\right)$$

represents a first matching degree between the $l^{th}$-layer environmental feature map and the map feature in a case of a candidate pose $$T^l_{pqr}$$

(that is, in a case of a first candidate pose offset $$\Delta T^l_{pqr}),$$

and may be calculated according to formula (9).

Formula (15) to formula (17) are derived from a KL divergence formula, and can indicate the difference between the predicted probability distribution of the pose truth value and the real probability distribution of the pose truth value. The predicted probability distribution of the pose truth value is a probability distribution of a plurality of first candidate pose offsets, that is, the probability distribution calculated according to formula (10). The real probability distribution of the pose truth value is a Dirac distribution (leptokurtic distribution) of a probability 1 at the pose truth value.

According to some embodiments, the overall loss of the positioning model may be a weighted sum of the first loss $L_{rmse}$ and the second loss $$L^{ps}_{KL}.$$

According to some embodiments, the pose solver is further configured to: perform sampling within a second offset sampling range to obtain a plurality of second candidate pose offsets; and determine, for any second candidate pose offset of the plurality of second candidate pose offsets, a second matching degree between the environmental feature and the map feature in a case of the second candidate pose offset.

Correspondingly, the method 600 further includes: determining a third loss based on second matching degrees respectively corresponding to the plurality of second candidate pose offsets, where the third loss indicates a difference between a predicted probability distribution of a plurality of candidate poses and a real probability distribution of the plurality of candidate poses, and the plurality of candidate poses are obtained by separately superimposing the plurality of second candidate pose offsets and a current pose.

It should be noted that the second offset sampling range is usually larger than the first offset sampling range. The first offset sampling range is determined in step S2421 described above.

The second matching degree may be calculated with reference to formula (9).

The current pose is a sum of the initial pose and a predicted pose offset corresponding to each solving layer before the current solving layer.

The third loss is a sampled pose distribution KL divergence loss. According to some embodiments, the third loss $$L_{KL}^{rs}$$

may be calculated according to the following formulas:

$$\eta_l = -\log\frac{\exp(S_l(T_{gt}^l))}{\frac{1}{N_r}\sum_{1\le j\le N_r}\frac{1}{q(T_j^l)}\exp(S_l(T_j^l))} \tag{18}$$

$$\tau_l = \begin{cases} \eta_l & \eta_l \ge 0 \\ \exp(\eta_l) - 1 & \eta_l < 0 \end{cases} \tag{19}$$

$$L_{KL}^{rs} = \frac{1}{3}\sum_{l=0}^{2}\tau_l \tag{20}$$

$$T_{gt}^l$$

represents the pose truth value of the $l^{th}$ solving layer. It can be understood that the pose truth values of all the solving layers are the same. q(•) represents a probability density function of a pose sampling proposal distribution, where an xy sampling distribution is a multivariate t distribution, and a sampling distribution in a yaw direction is a mixed distribution of a von Mises distribution and a uniform distribution.

$$T_j^l$$

is a sampled candidate pose. $N_r$ is the number of sampled candidate poses.

$$S_l(T_{gt}^l)$$

represents the matching degree between the $l^{th}$-layer environmental feature map and the map feature in the case of the pose truth value, and may be calculated with reference to formula (9).

$$S_l(T_j^l)$$

represents a second matching degree between the $l^{th}$-layer environmental feature map and the map feature in the case of the candidate pose $$T_j^l$$

(that is, in a case of a second candidate pose offset $$\Delta T_j^l),$$

and may be calculated with reference to formula (9).

Formula (18) to formula (20) are derived from the KL divergence formula, and can indicate the difference between the predicted probability distribution of the plurality of candidate poses and the real probability distribution of the plurality of candidate poses.

The third loss $$L_{KL}^{rs}$$

can ensure more complete feature learning, and improve feature learning effect as a supervisory signal.

According to some embodiments, the overall loss of the positioning model may be a weighted sum of the first loss $L_{rmse}$, the second loss $$L_{KL}^{ps},$$

and the third loss $$L_{KL}^{rs}.$$

According to some embodiments, the environmental feature includes an environmental feature map in a target space (for example, a BEV space). The element information of the map element includes category information (that is, semantic information). The map encoder is further configured to determine a semantic code corresponding to the category information of the map element based on a correspondence between a plurality of category information and a plurality of semantic codes, where the plurality of semantic codes are trainable parameters of the positioning model.

Correspondingly, the method 600 further includes: projecting a target map element of a target category in the plurality of map elements to the target three-dimensional space to obtain a truth value map of semantic segmentation in the target three-dimensional space, where a value of a first pixel in the truth value map indicates whether the first pixel is occupied by the target map element; determining a predicted map of semantic segmentation based on the environmental feature map, where a value of a second pixel in the predicted map indicates a similarity between a corresponding environmental feature vector and a semantic code of the target category, and the corresponding environmental feature vector is a feature vector of a pixel in the environmental feature map with a position corresponding to the second pixel; and determining a fourth loss based on the truth value map and the predicted map.

For example, for a target category j, a target map element of the category j is projected to the BEV space to obtain a truth value map $$S_j^{gt,l} \in \{0, 1\}^{H \times W}$$

of semantic segmentation of the category j in the lth-layer environmental feature map, where $$S_j^{gt,l}(h, w) = 1$$

represents that the first pixel (h, w) in the truth value map is occupied by the target map element of the category j, and $$S_j^{gt,l}(h, w) = 0$$

represents that the first pixel (h, w) in the truth value map is not occupied by the target map element of the category j.

A training objective of the semantic code is to make a semantic code $$E_j^{sem} \in \mathbb{R}^C$$

of the category j as close as possible to a BEV environmental feature vector $$F_l^B(h, w) \in \mathbb{R}^C$$

at $$S_j^{gt,l}(h, w) = 1$$

in the truth value map of BEV semantic segmentation. A predicted map $$S_j^l$$

of semantic segmentation of the category j in the lth-layer environmental feature map is constructed according to the following formula:

$$S_j^l(h, w) = \text{sigmoid}\left(F_l^B(h, w) \odot W_l E_j^{sem}\right) \tag{21}$$

$$S_j^l(h, w)$$

represents the value of the second pixel whose coordinates are (h, w) in the predicted map $$S_j^l$$

of the category j.

$$F_l^B(h, w)$$

is an environmental feature vector corresponding to a pixel whose coordinates are (h, w) in the $l^{th}$-layer environmental feature map $$F_l^B.$$

$W_l$ is a learnable model parameter.

$$E_j^{sem}$$

is the semantic code of the category j. $\odot$ represents a dot product.

The fourth loss is a semantic segmentation loss. According to some embodiments, the fourth loss $L_{ss}$ may be calculated according to the following formulas:

$$L_{ss} = \frac{1}{3} \sum_{l=0}^{2} \sum_{j=1}^{N_e} FC\left(S_j^l, S_j^{gt,l}\right) \tag{22}$$

$$FC\left(S_j^l, S_j^{gt,l}\right) = -\alpha_t (1 - p)^{\gamma} \log(p) \tag{23}$$

$$p = \begin{cases} S_j^l, & S_j^{gt,l} = 1 \\ 1 - S_j^l, & S_j^{gt,l} = 0 \end{cases} \tag{24}$$

$$\alpha_t = \begin{cases} \alpha, & S_j^{gt,l} = 1 \\ 1 - \alpha, & S_j^{gt,l} = 0 \end{cases} \tag{25}$$

$$\alpha = 0.8, \gamma = 2.0 \tag{26}$$

$N_e$ is the amount of category information.

According to the fourth loss $L_{ss}$, the semantic code is trainable, so that a capability of the semantic code in expressing the category information of the map element can be improved, and the positioning precision is improved.

According to some embodiments, the overall loss of the positioning model may be a weighted sum of the first loss $L_{rmse}$, the second loss $$L_{KL}^{ps},$$

and the fourth loss $L_{ss}$.

According to some embodiments, the overall loss $L_{sum}$ of the positioning model may be a weighted sum of the first loss $L_{rmse}$, the second loss $$L_{KL}^{ps},$$

the third loss $$L_{KL}^{rs},$$

and the fourth loss $L_{ss}$. That is:

$$L_{sum} = \alpha_1 L_{rmse} + \alpha_2 L_{KL}^{ps} + \alpha_3 L_{KL}^{rs} + \alpha_4 L_{ss} \quad (27)$$

$\alpha_1$ to $\alpha_4$ are weights of the first loss to the fourth loss respectively.

After the overall loss of the positioning model is determined, the parameter of the positioning model is adjusted through error back propagation based on the overall loss. The parameter of the positioning model includes the semantic code, a weight in a multi-layer perceptron, a weight in a convolution kernel, a projection matrix in an attention module, and the like.

It can be understood that steps S610 to S680 may be iteratively performed many times until a preset termination condition is satisfied. The termination condition may be that, for example, the overall loss is less than a loss threshold, the number of iterations reaches a number threshold, or the overall loss converges.

According to some embodiments, when the positioning model is trained, data enhancement processing may be performed on the training data, to improve generalization performance and robustness of the positioning model. Data enhancement processing includes, for example, enhancing a color, a contrast, and luminance of an image, randomly removing a part of an image region, randomly removing a specific type of map element (for example, a pole element) in a specific frame based on a specific probability, performing rotation transformation on coordinates of the map element and a global coordinate system, or performing rotation transformation on extrinsic parameters of a camera and a lidar.

Figure 7:
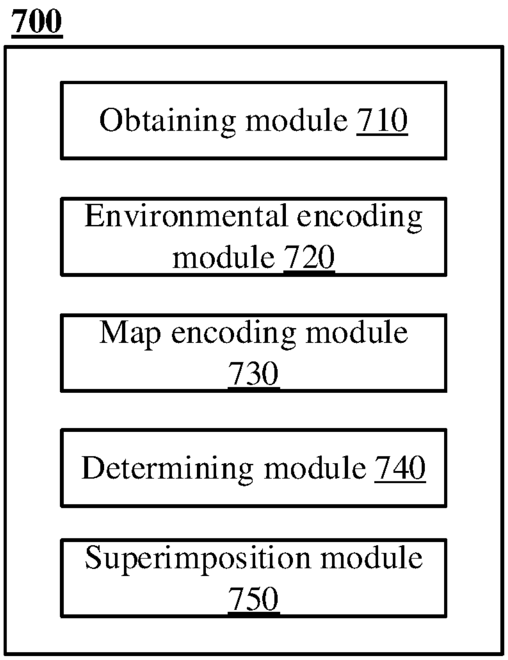
FIG. 7 is a block diagram of a structure of a vehicle positioning apparatus according to some embodiments of the present disclosure.

According to some embodiments of the present disclosure, a vehicle positioning apparatus is further provided. FIG. 7 is a block diagram of a structure of a vehicle positioning apparatus 700 according to some embodiments of the present disclosure. As shown in FIG. 7, the apparatus 700 includes an obtaining module 710, an environmental encoding module 720, a map encoding module 730, a determining module 740, and a superimposition module 750.

The obtaining module 710 is configured to obtain an initial pose of a vehicle, a multi-modal sensor data of the vehicle, and a plurality of map elements for positioning the vehicle.

The environmental encoding module 720 is configured to encode the multi-modal sensor data to obtain an environmental feature.

The map encoding module 730 is configured to encode the plurality of map elements to obtain a map feature.

The determining module 740 is configured to determine, based on the environmental feature and the map feature, a target pose offset for correcting the initial pose.

The superimposition module 750 is configured to superimpose the initial pose and the target pose offset to obtain a corrected pose of the vehicle.

According to the embodiments of the present disclosure, the multi-modal sensor data is encoded, so that data of each sensor can be fully utilized, information loss is reduced, and the environmental feature can express surroundings of the vehicle comprehensively and accurately. The target pose offset is determined based on the environmental feature and the map feature, and the initial pose is corrected based on the target pose offset, so that precision of positioning the vehicle can be improved, and the vehicle can be positioned accurately even in a complex environment.

According to some embodiments, the initial pose is a pose output by an integrated positioning system of the vehicle.

According to some embodiments, the multi-modal sensor data includes a point cloud and an image. The environmental encoding module includes: a point cloud encoding unit configured to encode the point cloud to obtain a point cloud feature map in a target three-dimensional space; an image encoding unit configured to encode the image to obtain an image feature map; and a fusion unit configured to fuse the point cloud feature map and the image feature map to obtain the environmental feature.

According to some embodiments, the target three-dimensional space is a bird's eye view space of the vehicle.

According to some embodiments, the fusion unit includes: an initialization subunit configured to determine an initial environmental feature map in the target three-dimensional space based on the point cloud feature map; a first fusion subunit configured to fuse the initial environmental feature map and the image feature map to obtain a first environmental feature map in the target three-dimensional space; and a determining subunit configured to determine the environmental feature based on the first environmental feature map.

According to some embodiments, the first fusion subunit is further configured to: perform at least one fusion on the initial environmental feature map and the image feature map based on attention mechanism, to obtain the first environmental feature map.

According to some embodiments, the first fusion subunit is further configured to: in each fusion of the at least one fusion: update a current environmental feature map based on self-attention mechanism, to obtain an updated environmental feature map; and fuse the updated environmental feature map and the image feature map based on cross-attention mechanism, to obtain a fused environmental feature map, where the current environmental feature map in a first fusion is the initial environmental feature map, the current environmental feature map in a second fusion or each subsequent fusion is the fused environmental feature map obtained by a previous fusion, and the first environmental feature map is the fused environmental feature map obtained by a last fusion.

According to some embodiments, the first fusion subunit is further configured to: input the initial environmental feature map and the image feature map to a trained first transformer decoder to obtain the first environmental feature map output by the first transformer decoder.

According to some embodiments, the determining subunit is further configured to: perform at least one upsampling on the first environmental feature map to obtain at least one second environmental feature map respectively corresponding to the at least one upsampling; and determine the first environmental feature map and the at least one second environmental feature map as the environmental feature.

According to some embodiments, the plurality of map elements are obtained by screening a plurality of geographical elements in a vectorized map based on the initial pose.

According to some embodiments, the plurality of map elements include at least one road element and at least one geometrical element. The at least one road element includes at least one of the following: a lane line, a curb, a crosswalk, a stop line, a traffic sign, or a pole. The at least one geometrical element includes a surface element.

According to some embodiments, the surface element is obtained by extracting a plane in a point cloud map.

According to some embodiments, the map encoding module includes: an initialization unit configured to encode, for any map element of the plurality of map elements, element information of the map element to obtain an initial encoding vector of the map element; and an updating unit configured to update the initial encoding vector based on the environmental feature to obtain a target encoding vector of the map element, where the map feature includes respective target encoding vectors of the plurality of map elements.

According to some embodiments, the element information includes position information and category information. The initialization unit includes: a first encoding subunit configured to encode the position information to obtain a position code; a second encoding subunit configured to encode the category information to obtain a semantic code; and a second fusion subunit configured to fuse the position code and the semantic code to obtain the initial encoding vector.

According to some embodiments, the second encoding subunit is further configured to: determine the semantic code of the map element based on a correspondence between a plurality of category information and a plurality of semantic codes, where the plurality of semantic codes are parameters of a positioning model, and are obtained by training the positioning model.

According to some embodiments, the updating unit is further configured to: perform at least one update on the initial encoding vector using the environmental feature based on attention mechanism, to obtain the target encoding vector.

According to some embodiments, the updating unit is further configured to: in each update of the at least one update: update a current encoding vector based on self-attention mechanism, to obtain an updated encoding vector; and fuse the updated encoding vector and the environmental feature based on cross-attention mechanism, to obtain a fused encoding vector, where the current encoding vector in a first update is the initial encoding vector, the current encoding vector in a second update or each subsequent update is the fused encoding vector obtained by a previous update, and the target encoding vector is the fused encoding vector obtained by a last update.

According to some embodiments, the environmental feature includes a plurality of environmental feature maps in the target three-dimensional space. The plurality of environmental feature maps are of different sizes. The updating unit is further configured to: update the initial encoding vector based on an environmental feature map of a minimum size in the plurality of environmental feature maps.

According to some embodiments, the updating unit is further configured to: input the initial encoding vector and the environmental feature to a trained second transformer decoder to obtain the target encoding vector output by the second transformer decoder.

According to some embodiments, the determining module is further configured to: match the environmental feature with the map feature to determine the target pose offset.

According to some embodiments, the environmental feature includes at least one environmental feature map in the target three-dimensional space. The at least one environmental feature map is of a different size. The determining module includes: a sorting unit configured to arrange the at least one environmental feature map in ascending order of sizes; and a determining unit configured to: for any environmental feature map of the at least one environmental feature map: match the environmental feature map with the map feature to determine a first pose offset; and superimpose a current pose offset and the first pose offset to obtain an updated pose offset, where the current pose offset corresponding to a first environmental feature map is an all-zero vector, the current pose offset corresponding to a second environmental feature map or each subsequent environmental feature map is the updated pose offset corresponding to a previous environmental feature map, and the target pose offset is the updated pose offset corresponding to a last environmental feature map.

According to some embodiments, the determining unit includes: a sampling subunit configured to perform sampling within a preset offset sampling range to obtain a plurality of candidate pose offsets; a determining subunit configured to determine, for any candidate pose offset of the plurality of candidate pose offsets, a matching degree between the environmental feature map and the map feature in a case of the candidate pose offset; and a third fusion subunit configured to fuse the plurality of candidate pose offsets based on the matching degree corresponding to each candidate pose offset of the plurality of candidate pose offsets, to obtain the first pose offset.

According to some embodiments, a size of the offset sampling range is negatively correlated with the size of the environmental feature map.

According to some embodiments, the map feature includes a target encoding vector of each map element of the plurality of map elements. The determining subunit is further configured to: superimpose a current pose and the candidate pose offset to obtain a candidate pose, where the current pose is a sum of the initial pose and a first pose offset corresponding to each environmental feature map before the environmental feature map; for any map element of the plurality of map elements: project the map element to the target three-dimensional space based on the candidate pose, to obtain an environmental feature vector corresponding to the map element in the environmental feature map; and calculate a similarity between the target encoding vector of the map element and the environmental feature vector; and determine the matching degree between the environmental feature map and the map feature in the case of the candidate pose offset based on the similarity corresponding to each map element of the plurality of map elements.

According to some embodiments, the third fusion subunit is further configured to: determine, for any candidate pose offset of the plurality of candidate pose offsets, a probability of the candidate pose offset based on a ratio of the matching degree corresponding to the candidate pose offset to a sum of the matching degrees corresponding to the plurality of candidate pose offsets; and determine an expectation of the plurality of candidate pose offsets as the first pose offset.

According to some embodiments, the determining module is further configured to: input the environmental feature, the map feature, and the initial pose to a trained pose solver, to obtain the target pose offset output by the pose solver.

It should be understood that the modules or units of the apparatus 700 shown in FIG. 7 may correspond to the steps in the method 200 described in FIG. 2. Therefore, the operations, features, and advantages described in the method 200 are also applicable to the apparatus 700 and the modules and units included therein. For the sake of brevity, some operations, features, and advantages are not described herein again.

Figure 8:
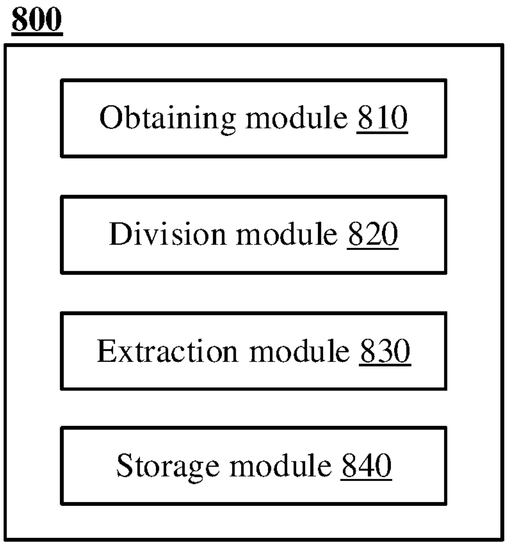
FIG. 8 is a block diagram of a structure of a vectorized map construction apparatus according to some embodiments of the present disclosure.

According to some embodiments of the present disclosure, a vectorized map construction apparatus is further provided. FIG. 8 is a block diagram of a structure of a vectorized map construction apparatus 800 according to some embodiments of the present disclosure. As shown in FIG. 8, the apparatus 800 includes an obtaining module 810, a division module 820, an extraction module 830, and a storage module 840.

The obtaining module 810 is configured to obtain a point cloud in a point cloud map.

The division module 820 is configured to divide a projection plane of the point cloud map into a plurality of two-dimensional grids of a first unit size.

The extraction module 830 is configured to extract, for any two-dimensional grid of the plurality of two-dimensional grids, a plane in the two-dimensional grid based on a point cloud in a three-dimensional space corresponding to the two-dimensional grid.

The storage module 840 is configured to store the plane as a surface element in a vectorized map.

According to the embodiments of the present disclosure, the plane is extracted from the point cloud map, and the extracted plane is stored as the surface element in the vectorized map, so that richness and a density of geographical elements in the vectorized map can be improved, and precision of positioning a vehicle is improved.

The vectorized map is far smaller than the point cloud map, and is convenient to update. The vectorized map (not the point cloud map) is stored to the vehicle, so that storage costs of the vehicle can be reduced greatly, applicability of the vehicle positioning method can be improved, and a mass production need can be satisfied. It is verified by an experiment that a size of the vectorized map is about 0.35 M/km. Compared with that of the point cloud map, the size of the vectorized map is reduced by 97.5%.

According to some embodiments, the extraction module includes: a division unit configured to divide the three-dimensional space into a plurality of three-dimensional grids of a second unit size in a height direction; an extraction unit configured to: for any three-dimensional grid of the plurality of three-dimensional grids: calculate, based on a point cloud in the three-dimensional grid, a confidence level that the three-dimensional grid includes a plane; and extract the plane in the three-dimensional grid in response to the confidence level being greater than a threshold; and a first determining unit configured to determine a plane with a maximum confidence level in the plurality of three-dimensional grids as the plane corresponding to the two-dimensional grid.

According to some embodiments, the extraction unit includes: a decomposition subunit configured to perform singular value decomposition on a covariance matrix of the point cloud in the three-dimensional grid to obtain a first singular value, a second singular value, and a third singular value, where the first singular value is less than or equal to the second singular value, and the second singular value is less than or equal to the third singular value; and a determining subunit configured to determine a ratio of the second singular value to the first singular value as the confidence level.

According to some embodiments, the storage module includes: a second determining unit configured to determine an identifier of the surface element corresponding to the plane; and a storage unit configured to store, in association with the identifier, coordinates of a point on the plane and a unit normal vector of the plane.

According to some embodiments, the vectorized map further includes a plurality of road elements. Any one of the plurality of road elements is a lane line, a curb, a crosswalk, a stop line, a traffic sign, or a pole.

It should be understood that the modules or units of the apparatus 800 shown in FIG. 8 may correspond to the steps in the method 500 described in FIG. 5. Therefore, the operations, features, and advantages described in the method 500 are also applicable to the apparatus 800 and the modules and units included therein. For the sake of brevity, some operations, features, and advantages are not described herein again.

Figure 9:
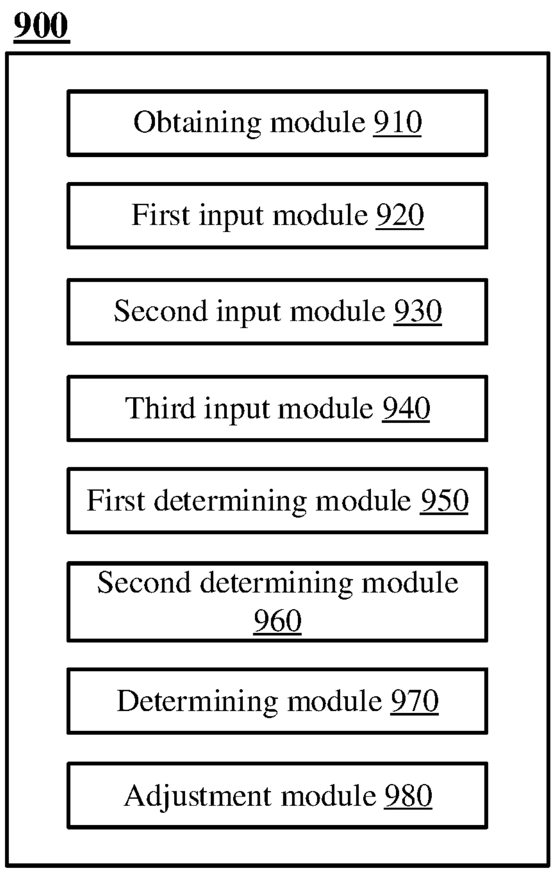
FIG. 9 is a block diagram of a structure of a positioning model training apparatus according to some embodiments of the present disclosure.

According to some embodiments of the present disclosure, a positioning model training apparatus is further provided. FIG. 9 is a block diagram of a structure of a positioning model training apparatus 900 according to some embodiments of the present disclosure. A positioning model includes an environmental encoder, a map encoder, and a pose solver.

As shown in FIG. 9, the apparatus 900 includes an obtaining module 910, a first input module 920, a second input module 930, a third input module 940, a first determining module 950, a second determining module 960, a determining module 970, and an adjustment module 980.

The obtaining module 910 is configured to obtain an initial pose of a sample vehicle, a pose truth value corresponding to the initial pose, a multi-modal sensor data of the sample vehicle, and a plurality of map elements for positioning the sample vehicle.

The first input module 920 is configured to input the multi-modal sensor data to the environmental encoder to obtain an environmental feature.

The second input module 930 is configured to input element information of the plurality of map elements to the map encoder to obtain a map feature.

The third input module 940 is configured to input the environmental feature, the map feature, and the initial pose to the pose solver, such that the pose solver: performs sampling within a first offset sampling range to obtain a plurality of first candidate pose offsets; determines, for any first candidate pose offset of the plurality of first candidate pose offsets, a first matching degree between the environmental feature and the map feature in a case of the first candidate pose offset; and determines and outputs a predicted pose offset based on first matching degrees respectively corresponding to the plurality of first candidate pose offsets.

The first determining module 950 is configured to determine a first loss based on the predicted pose offset and a pose offset truth value, where the pose offset truth value is a difference between the pose truth value and the initial pose.

The second determining module 960 is configured to determine a second loss based on the first matching degrees respectively corresponding to the plurality of first candidate pose offsets, where the second loss indicates a difference between a predicted probability distribution of the pose truth value and a real probability distribution of the pose truth value.

The determining module 970 is configured to determine an overall loss of the positioning model based on at least the first loss and the second loss.

The adjustment module 980 is configured to adjust parameters of the positioning model based on the overall loss.

According to the embodiments of the present disclosure, the first loss can guide the positioning model to output a more accurate predicted pose offset. The second loss can guide the predicted probability distribution of the pose truth value to be close to the real probability distribution of the pose truth value, so as to avoid a multi-modal distribution. The overall loss of the positioning model is determined based on the first loss and the second loss, and the parameter of the positioning model is adjusted accordingly, so that positioning precision of the positioning model can be improved.

According to some embodiments, the pose solver is configured to: perform sampling within a second offset sampling range to obtain a plurality of second candidate pose offsets; and determine, for any second candidate pose offset of the plurality of second candidate pose offsets, a second matching degree between the environmental feature and the map feature in a case of the second candidate pose offset.

The apparatus further includes: a third determining module configured to determine a third loss based on second matching degrees respectively corresponding to the plurality of second candidate pose offsets, where the third loss indicates a difference between a predicted probability distribution of a plurality of candidate poses and a real probability distribution of the plurality of candidate poses, and the plurality of candidate poses are obtained by separately superimposing the plurality of second candidate pose offsets and a current pose.

The determining module is further configured to: determine the overall loss based on at least the first loss, the second loss, and the third loss.

According to some embodiments, the environmental feature includes an environmental feature map in a target three-dimensional space. The element information includes category information. The map encoder is configured to: determine a semantic code corresponding to the category information based on a correspondence between a plurality of category information and a plurality of semantic codes, where the plurality of semantic codes are parameters of the positioning model.

The apparatus further includes: a projection module configured to project a target map element of a target category in the plurality of map elements to the target three-dimensional space to obtain a truth value map of semantic segmentation in the target three-dimensional space, where a value of a first pixel in the truth value map indicates whether the first pixel is occupied by the target map element; a prediction module configured to determine a predicted map of semantic segmentation based on the environmental feature map, where a value of a second pixel in the predicted map indicates a similarity between a corresponding environmental feature vector and a semantic code of the target category, and the corresponding environmental feature vector is a feature vector of a pixel in the environmental feature map with a position corresponding to the second pixel; and a fourth determining module configured to determine a fourth loss based on the truth value map and the predicted map.

The determining module is further configured to: determine the overall loss based on at least the first loss, the second loss, and the fourth loss.

It should be understood that the modules or units of the apparatus 900 shown in FIG. 9 may correspond to the steps in the method 600 described in FIG. 6. Therefore, the operations, features, and advantages described in the method 600 are also applicable to the apparatus 900 and the modules and units included therein. For the sake of brevity, some operations, features, and advantages are not described herein again.

Although specific functions are discussed above with reference to specific modules, it should be noted that the functions of the various modules discussed herein may be divided into a plurality of modules, and/or at least some functions of a plurality of modules may be combined into a single module.

It should be further understood that various technologies may be described herein in the general context of software and hardware elements or program modules. The various modules described above with respect to FIG. 7 to FIG. 9 may be implemented in hardware or in hardware incorporating software and/or firmware. For example, these modules may be implemented as computer program code/instructions configured to be executed in one or more processors and stored in a computer-readable storage medium. Alternatively, these modules may be implemented as hardware logic/circuitry. For example, in some embodiments, one or more of the modules 710 to 980 may be implemented together in a system on chip (SoC). The SoC may include an integrated circuit chip (which includes a processor (e.g., a central processing unit (CPU), a microcontroller, a microprocessor, and a digital signal processor (DSP)), a memory, one or more communication interfaces, and/or one or more components in other circuits), and may optionally execute received program code and/or include embedded firmware to perform functions.

According to some embodiments of the present disclosure, an electronic device is further provided, including: at least one processor; and a memory communicatively connected to the at least one processor. The memory stores instructions executable by the at least one processor. The instructions, when executed by the at least one processor, cause the at least one processor to perform any one of the vehicle positioning method, the vectorized map construction method, and the positioning model training method according to the embodiments of the present disclosure.

According to some embodiments of the present disclosure, a non-transitory computer-readable storage medium storing computer instructions is further provided. The computer instructions are used to cause a computer to perform any one of the vehicle positioning method, the vectorized map construction method, and the positioning model training method according to the embodiments of the present disclosure.

According to some embodiments of the present disclosure, a computer program product is further provided, including computer program instructions. When the computer program instructions are executed by a processor, any one of the vehicle positioning method, the vectorized map construction method, and the positioning model training method according to the embodiments of the present disclosure is implemented.

According to some embodiments of the present disclosure, an autonomous vehicle is further provided, including the above electronic device.

Figure 10:
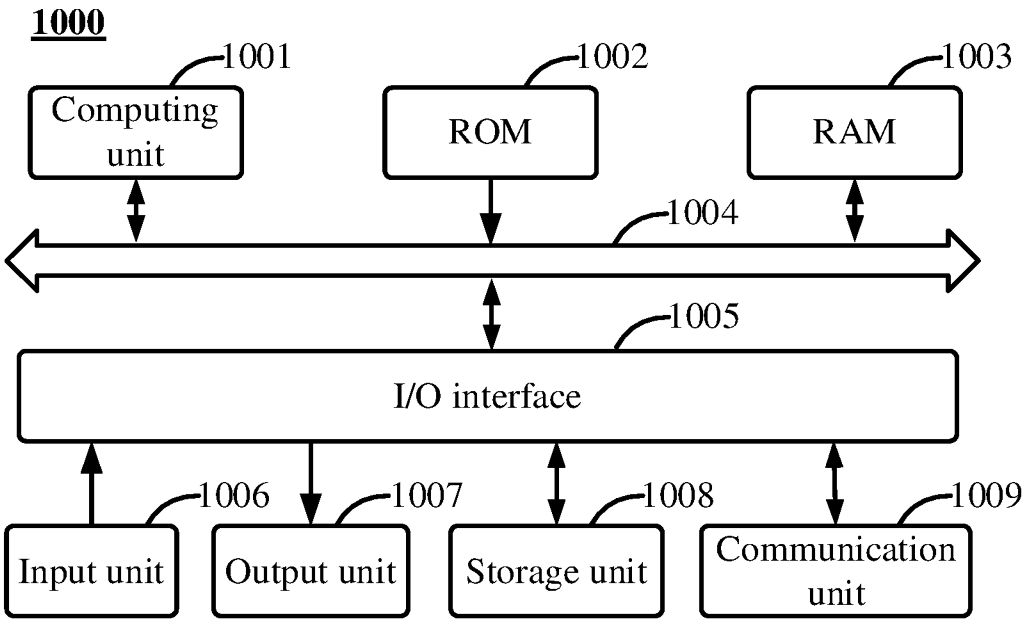
FIG. 10 is a block diagram of a structure of an example electronic device that can be used to implement embodiments of the present disclosure.

Refer to FIG. 10. A block diagram of a structure of an electronic device 1000 that can serve as a server or a client of the present disclosure is now described, which is an example of a hardware device that can be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit implementation of the present disclosure described and/or required herein.

As shown in FIG. 10, the electronic device 1000 includes a computing unit 1001. The computing unit may perform various appropriate actions and processing according to a computer program stored in a read-only memory (ROM) 1002 or a computer program loaded from a storage unit 1008 to a random access memory (RAM) 1003. The RAM 1003 may further store various programs and data required for the operation of the electronic device 1000. The computing unit 1001, the ROM 1002, and the RAM 1003 are connected to each other through a bus 1004. An input/output (I/O) interface 1005 is also connected to the bus 1004.

A plurality of components in the electronic device 1000 are connected to the I/O interface 1005, including: an input unit 1006, an output unit 1007, the storage unit 1008, and a communication unit 1009. The input unit 1006 may be any type of device through which information can be entered to the electronic device 1000. The input unit 1006 may receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit 1007 may be any type of device capable of presenting information, and may include, but is not limited to, a display, a speaker, a video/audio output terminal, a vibrator, and/or a printer. The storage unit 1008 may include, but is not limited to, a magnetic disk and an optical disk. The communication unit 1009 allows the electronic device 1000 to exchange information/data with other devices through a computer network such as the Internet and/or various telecommunication networks, and may include, but is not limited to, a modem, a network interface card, an infrared communication device, a wireless communication transceiver, and/or a chipset, for example, a Bluetooth device, an 802.11 device, a Wi-Fi device, a WiMax device, or a cellular communication device.

The computing unit 1001 may be various general-purpose and/or special-purpose processing components with processing and computing capabilities. Some examples of the computing unit 1001 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 1001 carries out the various methods and processing described above, for example, the methods 200, 500, and 600. For example, in some embodiments, the methods 200, 500, and 600 may be implemented as a computer software program, which is tangibly contained in a machine-readable medium, such as the storage unit 1008. In some embodiments, a part or all of the computer program may be loaded and/or installed onto the electronic device 1000 through the ROM 1002 and/or the communication unit 1009. When the computer program is loaded onto the RAM 1003 and executed by the computing unit 1001, one or more steps of the method 200 described above can be performed. Alternatively, in other embodiments, the computing unit 1001 may be configured, by any other suitable means (for example, by means of firmware), to carry out the methods 200, 500, and 600.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: The systems and technologies are implemented in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and a pointing apparatus (for example, a mouse or a trackball) through which the user can provide an input to the computer. Other categories of apparatuses can also be used to provide interaction with the user; for example, feedback provided to the user can be any form of sensory feedback (for example, visual feedback, auditory feedback, or tactile feedback), and an input from the user can be received in any form (including an acoustic input, a voice input, or a tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communication network) in any form or medium. Examples of the communication network include: a local area network (LAN), a wide area network (WAN), the Internet, and a blockchain network.

A computer system may include a client and a server. The client and the server are generally far away from each other and usually interact through a communication network. A relationship between the client and the server is generated by computer programs running on respective computers and having a client-server relationship with each other. The server may be a cloud server, a server in a distributed system, or a server combined with a blockchain.

It should be understood that steps may be reordered, added, or deleted based on the various forms of procedures shown above. For example, the steps recorded in the present disclosure may be performed in parallel, in order, or in a different order, provided that the desired result of the technical solutions disclosed in the present disclosure can be achieved, which is not limited herein.

Although the embodiments or examples of the present disclosure have been described with reference to the drawings, it should be understood that the methods, systems and devices described above are merely example embodiments or examples, and the scope of the present disclosure is not limited by the embodiments or examples, and is only defined by the scope of the granted claims and the equivalents thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A method, comprising:

obtaining an initial pose of a vehicle, a multi-modal sensor data of the vehicle, and a plurality of map elements for positioning the vehicle;

encoding the multi-modal sensor data to obtain an environmental feature, wherein the environmental feature comprises at least one environmental feature map in a target three-dimensional space, and each environmental feature map of the at least one environmental feature map is of a different size;

encoding the plurality of map elements to obtain a map feature;

determining, based on the environmental feature and the map feature, a target pose offset for correcting the initial pose; and superimposing the initial pose and the target pose offset to obtain a corrected pose of the vehicle;

wherein the determining the target pose offset for correcting the initial pose comprises:

arranging each environmental feature map of the at least one environmental feature map in ascending order of sizes; and for each environmental feature map of the at least one environmental feature map:

matching the environmental feature map with the map feature to determine a first pose offset; and superimposing a current pose offset and the first pose offset to obtain an updated pose offset; and wherein the current pose offset corresponding to a first environmental feature map in the ascending order of sizes is an all-zero vector, the current pose offset corresponding to a second environmental feature map or each subsequent environmental feature map is the updated pose offset corresponding to a previous environmental feature map in the ascending order of sizes, and the target pose offset is the updated pose offset corresponding to a last environmental feature map in the ascending order of sizes.

2. The method according to claim 1, wherein the multi-modal sensor data comprises a point cloud and an image, and wherein the encoding the multi-modal sensor data to obtain the environmental feature comprises:

encoding the point cloud to obtain a point cloud feature map;

encoding the image to obtain an image feature map; and fusing the point cloud feature map and the image feature map to obtain the environmental feature.

3. The method according to claim 2, wherein the fusing the point cloud feature map and the image feature map to obtain the environmental feature comprises:

determining an initial environmental feature map in a target three-dimensional space based on the point cloud feature map;

fusing the initial environmental feature map and the image feature map to obtain a first environmental feature map in the target three-dimensional space; and determining the environmental feature based on the first environmental feature map.

4. The method according to claim 3, wherein the fusing the initial environmental feature map and the image feature map to obtain the first environmental feature map comprises:

performing at least one fusion on the initial environmental feature map and the image feature map based on attention mechanism, to obtain the first environmental feature map.

5. The method according to claim 4, wherein the performing at least one fusion on the initial environmental feature map and the image feature map based on attention mechanism, to obtain the first environmental feature map comprises:

in each fusion of the at least one fusion:

updating a current environmental feature map based on self-attention mechanism, to obtain an updated environmental feature map; and fusing the updated environmental feature map and the image feature map based on cross-attention mechanism, to obtain a fused environmental feature map, wherein:

the current environmental feature map in a first fusion is the initial environmental feature map, the current environmental feature map in a second fusion or each subsequent fusion is the fused environmental feature map obtained by a previous fusion, and the first environmental feature map is the fused environmental feature map obtained by a last fusion.

6. The method according to claim 3, wherein the determining the environmental feature comprises:

performing at least one upsampling on the first environmental feature map to obtain at least one second environmental feature map respectively corresponding to the at least one upsampling; and determining the first environmental feature map and the at least one second environmental feature map as the environmental feature.

7. The method according to claim 1, wherein the encoding the plurality of map elements to obtain the map feature comprises:

encoding, for any map element of the plurality of map elements, element information of the map element to obtain an initial encoding vector of the map element; and updating the initial encoding vector based on the environmental feature to obtain a target encoding vector of the map element, wherein the map feature comprises respective target encoding vectors of the plurality of map elements.

8. The method according to claim 7, wherein the element information comprises position information and category information, and wherein the encoding the element information of the map element to obtain an initial encoding vector of the map element comprises:

encoding the position information to obtain a position code;

encoding the category information to obtain a semantic code; and fusing the position code and the semantic code to obtain the initial encoding vector.

9. The method according to claim 7, wherein the updating the initial encoding vector to obtain the target encoding vector of the map element comprises:

performing at least one update on the initial encoding vector using the environmental feature based on attention mechanism, to obtain the target encoding vector.

10. The method according to claim 9, wherein the performing at least one update on the initial encoding vector using the environmental feature based on attention mechanism, to obtain the target encoding vector comprises:

in each update of the at least one update:

updating a current encoding vector based on self-attention mechanism, to obtain an updated encoding vector; and fusing the updated encoding vector and the environmental feature based on cross-attention mechanism, to obtain a fused encoding vector, wherein:

the current encoding vector in a first update is the initial encoding vector, the current encoding vector in a second update or each subsequent update is the fused encoding vector obtained by a previous update, and the target encoding vector is the fused encoding vector obtained by a last update.

11. The method according to claim 1, wherein, for each environmental feature map of the at least one environmental feature map, the matching the environmental feature map with the map feature to determine the first pose offset comprises:

performing sampling within a preset offset sampling range to obtain a plurality of candidate pose offsets;

determining, for any candidate pose offset of the plurality of candidate pose offsets, a matching degree between the environmental feature map and the map feature in a case of the candidate pose offset; and fusing the plurality of candidate pose offsets based on the matching degree corresponding to each candidate pose offset of the plurality of candidate pose offsets, to obtain the first pose offset.

12. The method according to claim 11, wherein a size of the offset sampling range is negatively correlated with a size of the environmental feature map.

13. The method according to claim 11, wherein the map feature comprises a target encoding vector of each map element of the plurality of map elements, and wherein the determining the matching degree between the environmental feature map and the map feature in a case of the candidate pose offset comprises:

superimposing a current pose and the candidate pose offset to obtain a candidate pose, wherein the current pose is a sum of the initial pose and a first pose offset corresponding to each environmental feature map before the environmental feature map;

for any map element of the plurality of map elements:

projecting the map element to the target three-dimensional space based on the candidate pose, to obtain an environmental feature vector corresponding to the map element in the environmental feature map; and calculating a similarity between the target encoding vector of the map element and the environmental feature vector;

and determining the matching degree between the environmental feature map and the map feature in the case of the candidate pose offset based on the similarity corresponding to each map element of the plurality of map elements.

14. The method according to claim 11, wherein the fusing the plurality of candidate pose offsets to obtain the first pose offset comprises:

determining, for any candidate pose offset of the plurality of candidate pose offsets, a probability of the candidate pose offset based on a ratio of the matching degree corresponding to the candidate pose offset to a sum of the matching degrees corresponding to the plurality of candidate pose offsets; and determining an expectation of the plurality of candidate pose offsets as the first pose offset.

15. The method according to claim 1, wherein the plurality of map elements are obtained by screening a plurality of geographical elements in a vectorized map based on the initial pose, and wherein the vectorized map is constructed by operations comprising:

obtaining a point cloud in a point cloud map;

dividing a projection plane of the point cloud map into a plurality of two-dimensional grids of a first unit size; and for any two-dimensional grid of the plurality of two-dimensional grids:

extracting a plane in the two-dimensional grid based on a point cloud in a three-dimensional space corresponding to the two-dimensional grid; and storing the plane as a surface element in a vectorized map.

16. The method according to claim 1, wherein the method is implemented by a positioning model comprising an environmental encoder, a map encoder, and a pose solver, and wherein the positioning model is trained by operations comprising:

obtaining an initial pose of a sample vehicle, a pose truth value corresponding to the initial pose, a multi-modal sensor data of the sample vehicle, and a plurality of map elements for positioning the sample vehicle;

inputting the multi-modal sensor data to the environmental encoder to obtain an environmental feature;

inputting element information of the plurality of map elements to the map encoder to obtain a map feature;
inputting the environmental feature, the map feature, and the initial pose to the pose solver, such that the pose solver:
performs sampling within a first offset sampling range to obtain a plurality of first candidate pose offsets;
determines, for any first candidate pose offset of the plurality of first candidate pose offsets, a first matching degree between the environmental feature and the map feature in a case of the first candidate pose offset; and
determines and outputs a predicted pose offset based on first matching degrees respectively corresponding to the plurality of first candidate pose offsets;
determining a first loss based on the predicted pose offset and a pose offset truth value, wherein the pose offset truth value is a difference between the pose truth value and the initial pose;
determining a second loss based on the first matching degrees respectively corresponding to the plurality of first candidate pose offsets, wherein the second loss indicates a difference between a predicted probability distribution of the pose truth value and a real probability distribution of the pose truth value;
determining an overall loss of the positioning model based on at least the first loss and the second loss; and
adjusting parameters of the positioning model based on the overall loss.

17. An electronic device, comprising:
a processor; and
a memory communicatively connected to the processor, wherein the memory stores instructions executable by the processor, and the instructions, when executed by the processor, cause the processor to perform operations comprising:
obtaining an initial pose of a vehicle, a multi-modal sensor data of the vehicle, and a plurality of map elements for positioning the vehicle;
encoding the multi-modal sensor data to obtain an environmental feature, wherein the environmental feature comprises at least one environmental feature map in a target three-dimensional space, and each environmental feature map of the at least one environmental feature map is of a different size;
encoding the plurality of map elements to obtain a map feature;
determining, based on the environmental feature and the map feature, a target pose offset for correcting the initial pose; and
superimposing the initial pose and the target pose offset to obtain a corrected pose of the vehicle,
wherein the determining the target pose offset for correcting the initial pose comprises:
arranging each environmental feature map of the at least one environmental feature map in ascending order of sizes; and
for each environmental feature map of the at least one environmental feature map:
matching the environmental feature map with the map feature to determine a first pose offset; and
superimposing a current pose offset and the first pose offset to obtain an updated pose offset; and
wherein the current pose offset corresponding to a first environmental feature map in the ascending order of sizes is an all-zero vector, the current pose offset corresponding to a second environmental feature map or each subsequent environmental feature map is the updated pose offset corresponding to a previous environmental feature map in the ascending order of sizes, and the target pose offset is the updated pose offset corresponding to a last environmental feature map in the ascending order of sizes.

18. A non-transitory computer-readable storage medium storing computer instructions, wherein the computer instructions are configured to enable a computer to perform operations comprising:
obtaining an initial pose of a vehicle, a multi-modal sensor data of the vehicle, and a plurality of map elements for positioning the vehicle;
encoding the multi-modal sensor data to obtain an environmental feature, wherein the environmental feature comprises at least one environmental feature map in a target three-dimensional space, and each environmental feature map of the at least one environmental feature map is of a different size;
encoding the plurality of map elements to obtain a map feature;
determining, based on the environmental feature and the map feature, a target pose offset for correcting the initial pose; and
superimposing the initial pose and the target pose offset to obtain a corrected pose of the vehicle,
wherein the determining the target pose offset for correcting the initial pose comprises:
arranging each environmental feature map of the at least one environmental feature map in ascending order of sizes; and
for each environmental feature map of the at least one environmental feature map:
matching the environmental feature map with the map feature to determine a first pose offset; and
superimposing a current pose offset and the first pose offset to obtain an updated pose offset; and
wherein the current pose offset corresponding to a first environmental feature map in the ascending order of sizes is an all-zero vector, the current pose offset corresponding to a second environmental feature map or each subsequent environmental feature map is the updated pose offset corresponding to a previous environmental feature map in the ascending order of sizes, and the target pose offset is the updated pose offset corresponding to a last environmental feature map in the ascending order of sizes.

* * * * *